(12) United States Patent
Evanini et al.

(10) Patent No.: US 9,443,513 B2
(45) Date of Patent: Sep. 13, 2016

(54) SYSTEM AND METHOD FOR AUTOMATED DETECTION OF PLAGIARIZED SPOKEN RESPONSES

(71) Applicant: Educational Testing Service, Princeton, NJ (US)

(72) Inventors: Keelan Evanini, Pennington, NJ (US); Xinhao Wang, Lawrenceville, NJ (US)

(73) Assignee: Educational Testing Service, Princeton, NJ (US)

( * ) Notice: Subject to any disclaimer, the term of this patent is extended or adjusted under 35 U.S.C. 154(b) by 0 days.

(21) Appl. No.: 14/667,101

(22) Filed: Mar. 24, 2015

(65) Prior Publication Data
US 2015/0269932 A1   Sep. 24, 2015

Related U.S. Application Data

(60) Provisional application No. 61/969,458, filed on Mar. 24, 2014.

(51) Int. Cl.
| | |
|---|---|
| *G10L 15/18* | (2013.01) |
| *G10L 25/48* | (2013.01) |
| *G06F 17/27* | (2006.01) |
| *G10L 15/26* | (2006.01) |
| *G10L 15/197* | (2013.01) |

(52) U.S. Cl.
CPC ....... *G10L 15/1822* (2013.01); *G06F 17/2785* (2013.01); *G10L 25/48* (2013.01); *G10L 15/197* (2013.01); *G10L 15/26* (2013.01)

(58) Field of Classification Search
CPC .............................. G10L 15/08; G10L 15/26
USPC ............................................. 704/235–256.5
See application file for complete search history.

(56) References Cited

U.S. PATENT DOCUMENTS

| | | | | |
|---|---|---|---|---|
| 2012/0131015 | A1* | 5/2012 | Al Badrashiny | G06F 17/273 707/748 |
| 2012/0323573 | A1* | 12/2012 | Yoon | G09B 19/06 704/236 |

OTHER PUBLICATIONS

BNC. The British National Corpus; Oxford University Computing Services; 2007.
Brin, Sergey, Davis, James, Garcia-Molina, Hector; Copy Detection Mechanisms for Digital Documents; Proceedings of the ACM SIGMOD Annual Conference; pp. 398-409; 1995.

(Continued)

*Primary Examiner* — Marcellus Augustin
(74) *Attorney, Agent, or Firm* — Jones Day

(57) ABSTRACT

Systems and methods are provided for automated detection of plagiarized spoken responses. A spoken response is processed to generate a text that is representative of the spoken response. The text is processed to remove disfluencies in the text and to identify a plurality of sentences in the text. A first numerical measure indicative of a number of words and phrases of the text that are included verbatim in a source text is determined. The source text has been designated as a source of plagiarized content. A second numerical measure indicative of an amount of the text that paraphrases portions of the source text is determined. A third numerical measure indicative of a similarity between sentences of the text and sentences of the source text is determined. A model is applied to the first, second, and third numerical measures to classify the spoken response as being plagiarized or non-plagiarized.

27 Claims, 14 Drawing Sheets

(56) References Cited

OTHER PUBLICATIONS

Chen, Lei, Yoon, Su-Youn; Detecting Structural Events for Assessing Non-Native Speech; Proceedings of the 6th Workshop on Innovative Use of NLP for Building Educational Applications; pp. 38-45; Jun. 2011.

Chen, Chien-Ying, Yeh, Jen-Yuan, Ke, Hao-Ren; Plagiarism Detection Using Rouge and WordNet; Journal of Computing, 2(3); pp. 34-44; Mar. 2010.

Cullen, Pauline, French, Amanda, Jakeman, Vanessa; The Official Cambridge Guide to IELTS; Cambridge University Press; 2014.

ETS; The Official Guide to the TOEFL Test, Fourth Edition; McGraw-Hill: New York, NY; 2012.

Hoad, Timothy, Zobel, Justin; Methods for Identifying Versioned and Plagiarized Documents; Journal of the American Society for Information Science and Technology, 54(3); pp. 203-215; 2003.

Leacock, Claudia, Chodorow, Martin; Combining Local Context and WordNet Similarity for Word Sense Identification; Ch. 11 in WordNet: An Electronic Lexical Database, C. Fellbaum (Ed.); MIT Press; pp. 305-332; 1998.

Longman, Pearson; The Official Guide to Pearson Test of English Academic; Pearson Education ESL; 2010.

Lyon, Caroline, Barrett, Ruth, Malcolm, James; Plagiarism is Easy, but Also Easy to Detect; Plagiary: Cross-Disciplinary Studies in Plagiarism, Fabrication, and Falsification; pp. 57-65; 2006.

Nahnsen, Thade, Uzuner, Ozlem, Katz, Boris; Lexical Chains and Sliding Locality Windows in Context-Based Text Similarity Detection; International Joint Conference on Natural Language Processing; pp. 150-154; 2005.

Papineni, Kishore, Roukos, Salim, Ward, Todd, Zhu, Wei-Jing; Bleu: A Method for Automatic Evaluation of Machine Translation; Proceedings of the 40th Annual Meeting of the Association for Computational Linguistics; pp. 311-318; Jul. 2002.

Potthast, Martin, Stein, Benno, Barron-Cedeno, Alberto, Rosso, Paolo; An Evaluation Framework for Plagiarism Detection; Proceedings of the 23rd International Conference on Computational Linguistics; pp. 997-1002; Aug. 2010.

Potthast, Martin, Hagen, Matthias, Gollub, Tim, Tippmann, Martin, Kiesel, Johannes, Rosso, Paolo, Stamatatos, Efstathios, Stein, Benno; Overview of the 5th International Competition on Plagiarism Detection; CLEF 2013 Evaluation labs and Workshop—Working Notes Papers, P Forner, R. Navigli, Dan Tuffs (Eds.); Sep. 2013.

Shivakumar, Narayanan, Garcia-Molina, Hector; SCAM: A Copy Detection Mechanism for Digital Documents; Proceedings of the 2nd Annual Conference on the Theory and Practice of Digital Libraries; 1995.

Snover, Matthew, Dorr, Bonnie, Schwartz, Richard, Micciulla, Linnea, Makhoul, John; A Study of Translation Edit Rate with Targeting Human Annotation; Proceedings of Association for Machine Translation in the Americas; pp. 223-231; 2006.

Snover, Matthew, Madnani, Nitin, Dorr, Bonnie, Schwartz, Richard; TERp System Description; Proceedings of the 1st NIST Metrics for Machine Translation Challenge (MetricsMATR); Oct. 2008.

Uzuner, Ozlem, Katz, Boris, Nahnsen, Thade; Using Syntactic Information to Identify Plagiarism; Proceedings of the 2nd Workshop on Building Educational Applications Using NLP; pp. 37-44; Jun. 2005.

Wu, Zhibiao, Palmer, Martha; Verb Semantics and Lexical Selection; Proceedings of the 32nd Annual Meeting of the Association for Computational Linguistics; pp. 133-138; 1994.

\* cited by examiner

Item                                                202

Talk about a pleasant and memorable event that happened while you were in school. Explain why this event brings back fond memories.

FIG. 2A

ASR Output                                          206 well i remember when i i was in sixth grade there was a spelling bee kids from all classes um of the school competed again each of her i studied end studied for weeks and weeks when the day day of the contest came uh i was so completely end totally prepared umm i was able to win the contest easily

FIG. 2B

Processed Text                                      208

Well I remember when I was in sixth grade there was a spelling bee.  Kids from all classes of the school competed again each of her.  I studied end studied for weeks and weeks.  When the day of the contest came I was so completely end totally prepared I was able to win the contest easily.

FIG. 2C

Source Text (Source of Plagiarized Content)    210

Well, the place I enjoy the most is a small town located in France. I like this small town because it has very charming ocean view. I mean the sky there is so blue and the beach is always full of sunshine. You know how romantic it can ever be, just relax yourself on the beach, when the sun is setting down, when the ocean breeze is blowing and the seabirds are singing. Of course I like this small French town also because there are many great French restaurants. They offer the best seafood in the world like lobsters and tuna fishes. The most important, I have been benefited a lot from this trip to France because I made friends with some gorgeous French girls. One of them even gave me a little watch as a souvenir of our friendship.

FIG. 3

| | TER-Plus | TER | WER | Wordnet #1 | Wordnet #2 | Wordnet #3 | Wordnet #4 | LSA | BLEU |
|---|---|---|---|---|---|---|---|---|---|
| Document-Level Feature | (1) | (2) | (3) | (4) | (5) | (6) | (7) | (8) | (9) |
| Sentence-Level Feature #1 | (10) | (11) | (12) | (13) | (14) | (15) | (16) | (17) | (18) |
| Sentence-Level Feature #2 | (19) | (20) | (21) | (22) | (23) | (24) | (25) | (26) | (27) |
| Sentence-Level Feature #3 | (28) | (29) | (30) | (31) | (32) | (33) | (34) | (35) | (36) |

Example Similarity Metrics Used In Extracting Features

670

Example Feature Types

FIG. 6B

SYSTEM AND METHOD FOR AUTOMATED DETECTION OF PLAGIARIZED SPOKEN RESPONSES

CROSS-REFERENCE TO RELATED APPLICATIONS

This application claims priority to U.S. Provisional Patent Application No. 61/969,458, filed Mar. 24, 2014, entitled "Automatic Detection of Plagiarized Spoken Responses," which is incorporated herein by reference in its entirety.

FIELD

The technology described in this patent document relates generally to computer-based classification systems and more particularly to a system and method for automatically classifying a spoken response as being plagiarized or non-plagiarized.

BACKGROUND

To evaluate an individual's speaking proficiency, an assessment may elicit spontaneous speech (i.e., speech that has not been prepared prior to the assessment) from the individual. Example test items that elicit spontaneous speech from test-takers include the independent and integrated items in the Test of English as a Foreign Language (TOEFL) iBT test, the Retell Lecture item in the Pearson Test of English Academic, and the oral interview in the International English Language Testing System (IELTS) Academic assessment. With the increased emphasis on complex linguistic skills in these tests and the fact that high-stakes decisions can be made based on an individual's test score, there is a possibility that a test-taker's spoken response will contain "prepared" (i.e., "canned") material drawn from an external source. Such prepared material may be plagiarized from various sources (e.g., sources on the Internet, test preparation materials, etc.). Therefore, there is a need to detect spoken responses that are plagiarized to prevent this type of cheating strategy.

SUMMARY

The present disclosure is directed to a computer-implemented method, system, and non-transitory computer-readable storage medium for classifying a spoken response as being plagiarized or non-plagiarized. In an example computer-implemented method of classifying a spoken response as being plagiarized or non-plagiarized, a spoken response is processed with a processing system to generate a first text that is representative of the spoken response. The first text is processed with the processing system to remove disfluencies in the first text. The first text is processed with the processing system to identify a plurality of n-grams in the first text. The first text is processed with the processing system to identify a plurality of sentences in the first text. The plurality of n-grams and a source text are processed with the processing system to determine a first numerical measure indicative of a number of words and phrases of the first text that are included verbatim in the source text. Each of the n-grams is compared to n-grams of the source text to determine the first numerical measure. The source text has been designated as a source of plagiarized content. The first text and the source text are processed with the processing system to determine a second numerical measure indicative of (i) an amount of the first text that paraphrases portions of the source text, or (ii) an amount of the first text that is semantically-similar to portions of the source text. The second numerical measure is determined by comparing units of text of the first text with corresponding units of text of the source text. The plurality of sentences and the source text are processed with the processing system to determine a third numerical measure indicative of a similarity between sentences of the first text and sentences of the source text. Each sentence of the plurality of sentences is compared to each sentence of the source text to determine the third numerical measure. A model is applied to the first numerical measure, the second numerical measure, and the third numerical measure to classify the spoken response as being plagiarized or non-plagiarized. The model includes a first variable and an associated first weighting factor, the first variable receiving a value of the first numerical measure. The model also includes a second variable and an associated second weighting factor, the second variable receiving a value of the second numerical measure. The model further includes a third variable and an associated third weighting factor, the third variable receiving a value of the third numerical measure.

An example system for classifying a spoken response as being plagiarized or non-plagiarized includes a processing system and a computer-readable memory in communication with the processing system. The computer-readable memory is encoded with instructions for commanding the processing system to execute steps. In executing the steps, a spoken response is processed to generate a first text that is representative of the spoken response. The first text is processed to remove disfluencies in the first text. The first text is processed to identify a plurality of n-grams in the first text. The first text is processed to identify a plurality of sentences in the first text. The plurality of n-grams and a source text are processed to determine a first numerical measure indicative of a number of words and phrases of the first text that are included verbatim in the source text. Each of the n-grams is compared to n-grams of the source text to determine the first numerical measure. The source text has been designated as a source of plagiarized content. The first text and the source text are processed to determine a second numerical measure indicative of (i) an amount of the first text that paraphrases portions of the source text, or (ii) an amount of the first text that is semantically-similar to portions of the source text. The second numerical measure is determined by comparing units of text of the first text with corresponding units of text of the source text. The plurality of sentences and the source text are processed to determine a third numerical measure indicative of a similarity between sentences of the first text and sentences of the source text. Each sentence of the plurality of sentences is compared to each sentence of the source text to determine the third numerical measure. A model is applied to the first numerical measure, the second numerical measure, and the third numerical measure to classify the spoken response as being plagiarized or non-plagiarized. The model includes a first variable and an associated first weighting factor, the first variable receiving a value of the first numerical measure. The model also includes a second variable and an associated second weighting factor, the second variable receiving a value of the second numerical measure. The model further includes a third variable and an associated third weighting factor, the third variable receiving a value of the third numerical measure.

In an example non-transitory computer-readable storage medium for classifying a spoken response as being plagiarized or non-plagiarized, the computer-readable storage medium includes computer executable instructions which, when executed, cause a processing system to execute steps. In executing the steps, a spoken response is processed to generate a first text that is representative of the spoken response. The first text is processed to remove disfluencies in the first text. The first text is processed to identify a plurality of n-grams in the first text. The first text is processed to identify a plurality of sentences in the first text. The plurality of n-grams and a source text are processed to determine a first numerical measure indicative of a number of words and phrases of the first text that are included verbatim in the source text. Each of the n-grams is compared to n-grams of the source text to determine the first numerical measure. The source text has been designated as a source of plagiarized content. The first text and the source text are processed to determine a second numerical measure indicative of (i) an amount of the first text that paraphrases portions of the source text, or (ii) an amount of the first text that is semantically-similar to portions of the source text. The second numerical measure is determined by comparing units of text of the first text with corresponding units of text of the source text. The plurality of sentences and the source text are processed to determine a third numerical measure indicative of a similarity between sentences of the first text and sentences of the source text. Each sentence of the plurality of sentences is compared to each sentence of the source text to determine the third numerical measure. A model is applied to the first numerical measure, the second numerical measure, and the third numerical measure to classify the spoken response as being plagiarized or non-plagiarized. The model includes a first variable and an associated first weighting factor, the first variable receiving a value of the first numerical measure. The model also includes a second variable and an associated second weighting factor, the second variable receiving a value of the second numerical measure. The model further includes a third variable and an associated third weighting factor, the third variable receiving a value of the third numerical measure.

The present disclosure is also directed to a computer-implemented method, system, and non-transitory computer-readable storage medium for constructing a model to classify a spoken response as being plagiarized or non-plagiarized. In an example computer-implemented method of constructing a model to classify a spoken response as being plagiarized or non-plagiarized, a model is specified. The model includes a first variable and an associated first weighting factor. The first variable is indicative of a number of words and phrases of a first text that are included verbatim in a source text, as determined based on a comparison of n-grams of the first text to n-grams of the source text. The source text has been designated as a source of plagiarized content. The model also includes a second variable and an associated second weighting factor. The second variable is indicative of (i) an amount of the first text that paraphrases portions of the source text, or (ii) an amount of the first text that is semantically-similar to portions of the source text, as determined based on comparing units of text of the first text with corresponding units of text of the source text. The model also includes a third variable and an associated third weighting factor. The third variable is indicative of a similarity between sentences of the first text and sentences of the source text, as determined based on a comparison of each sentence of the first text with each sentence of the source text. A plurality of reference responses are received, where each reference response has been classified as being plagiarized or non-plagiarized. The reference responses have been accepted as usable for training the model. The model is trained with a processing system using the reference responses and the given classifications to determine values for each of the first, second, and third weighting factors. The model is configured with the determined values of the first, second, and third weighting factors to receive a first numerical measure, a second numerical measure, and a third numerical measure for the first variable, second variable, and third variable, respectively, of an actual spoken response to be classified so as to generate a classification for the actual spoken response that classifies the actual spoken response as being plagiarized or non-plagiarized.

An example system for constructing a model to classify a spoken response as being plagiarized or non-plagiarized includes a processing system and a computer-readable memory in communication with the processing system. The computer-readable memory is encoded with instructions for commanding the processing system to execute steps. In executing the steps, a model is specified. The model includes a first variable and an associated first weighting factor. The first variable is indicative of a number of words and phrases of a first text that are included verbatim in a source text, as determined based on a comparison of n-grams of the first text to n-grams of the source text. The source text has been designated as a source of plagiarized content. The model also includes a second variable and an associated second weighting factor. The second variable is indicative of (i) an amount of the first text that paraphrases portions of the source text, or (ii) an amount of the first text that is semantically-similar to portions of the source text, as determined based on comparing units of text of the first text with corresponding units of text of the source text. The model also includes a third variable and an associated third weighting factor. The third variable is indicative of a similarity between sentences of the first text and sentences of the source text, as determined based on a comparison of each sentence of the first text with each sentence of the source text. A plurality of reference responses are received, where each reference response has been classified as being plagiarized or non-plagiarized. The reference responses have been accepted as usable for training the model. The model is trained using the reference responses and the given classifications to determine values for each of the first, second, and third weighting factors. The model is configured with the determined values of the first, second, and third weighting factors to receive a first numerical measure, a second numerical measure, and a third numerical measure for the first variable, second variable, and third variable, respectively, of an actual spoken response to be classified so as to generate a classification for the actual spoken response that classifies the actual spoken response as being plagiarized or non-plagiarized.

An example non-transitory computer-readable storage medium for constructing a model to classify a spoken response as being plagiarized or non-plagiarized includes computer executable instructions. When executed, the computer executable instructions cause a processing system to execute steps. In executing the steps, a model is specified. The model includes a first variable and an associated first weighting factor. The first variable is indicative of a number of words and phrases of a first text that are included verbatim in a source text, as determined based on a comparison of n-grams of the first text to n-grams of the source text. The source text has been designated as a source of plagiarized content. The model also includes a second variable and an associated second weighting factor. The second variable is indicative of (i) an amount of the first text that paraphrases portions of the source text, or (ii) an amount of the first text that is semantically-similar to portions of the source text, as determined based on comparing units of text of the first text with corresponding units of text of the source text. The model also includes a third variable and an associated third weighting factor. The third variable is indicative of a similarity between sentences of the first text and sentences of the source text, as determined based on a comparison of each sentence of the first text with each sentence of the source text. A plurality of reference responses are received, where each reference response has been classified as being plagiarized or non-plagiarized. The reference responses have been accepted as usable for training the model. The model is trained using the reference responses and the given classifications to determine values for each of the first, second, and third weighting factors. The model is configured with the determined values of the first, second, and third weighting factors to receive a first numerical measure, a second numerical measure, and a third numerical measure for the first variable, second variable, and third variable, respectively, of an actual spoken response to be classified so as to generate a classification for the actual spoken response that classifies the actual spoken response as being plagiarized or non-plagiarized.

BRIEF DESCRIPTION OF THE DRAWINGS

FIG. 2A depicts an example item that is used to elicit a spontaneous spoken response from a test-taker.

FIG. 2B depicts an example output from an automatic speech recognition (ASR) system.

FIG. 2C depicts the ASR output of FIG. 2B after being processed to (i) remove disfluencies in the ASR output, and (ii) identify a plurality of sentences in the ASR output.

FIG. 3 depicts an example source text that has been designated as a source of plagiarized content.

FIG. 6B is a table depicting M features (e.g., 36 features) that are generated based on a comparison of the first text of FIG. 6A to the source text of FIG. 6A.

DETAILED DESCRIPTION

Figure 1A:
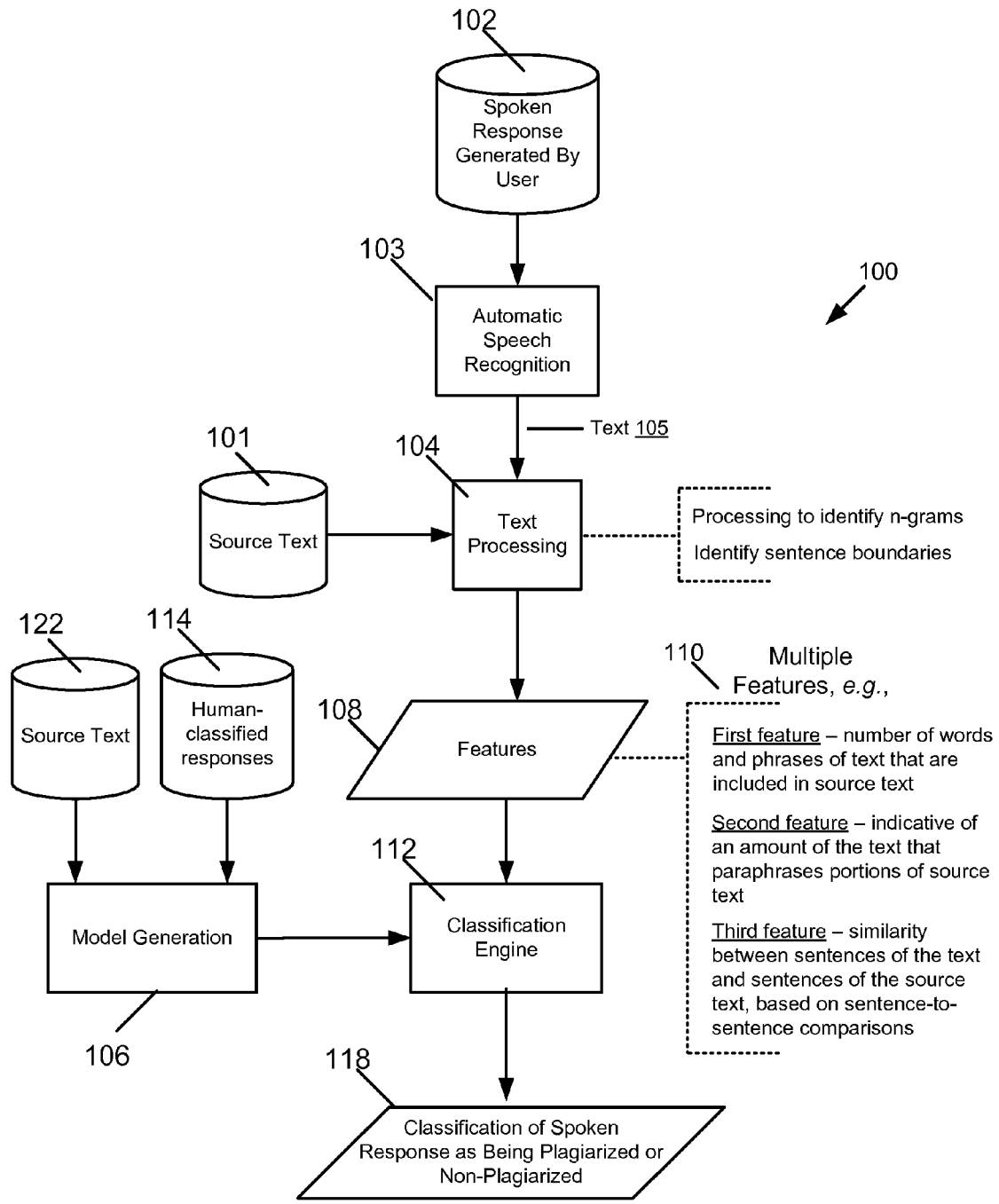
FIG. 1A is a block diagram illustrating an example system for classifying a spoken response as being plagiarized or non-plagiarized.

FIG. 1A is a block diagram 100 illustrating an example system for classifying a spoken response as being plagiarized or non-plagiarized. The example system of FIG. 1A comprises a computer-based system for automatically classifying a spoken response 102 from a user as being plagiarized or non-plagiarized. In an example, the spoken response 102 is provided by the user in response to an item (e.g., a test question, task, etc.) that elicits a spontaneous, spoken response (i.e., a spoken response that has not been prepared in advance by the user). In an example, the item may be an item on the Test of English as a Foreign Language (TOEFL) iBT test, which assesses English communication skills. A "speaking" section of the TOEFL iBT test includes six tasks, each of which requires the user (e.g., test-taker) to provide an extended spoken response containing spontaneous speech. Two of the tasks are referred to as "independent" tasks. These independent tasks cover topics that are familiar to users and require users to draw upon their own ideas, opinions, and experiences in a 45-second spoken response.

An example of such an independent task that elicits a spontaneous, spoken response from the user is depicted in FIG. 2A. As illustrated in FIG. 2A, an item 202 requests that the user "Talk about a pleasant and memorable event that happened while you were in school. Explain why this event brings back fond memories." The item 202 may include additional material not shown in FIG. 2A (e.g., additional directions requesting that the user speak for a certain amount of time, etc.) in other examples. Independent tasks such as the example item 202 of FIG. 2A ask questions that are not based on any provided stimulus materials (e.g., a reading passage, figure, picture, etc.), thus allowing the user to provide a spoken response that contains a wide variety of specific examples.

In responding to an item that elicits a spontaneous, spoken response, the user may attempt to game the assessment by memorizing prepared (i.e., canned) material from an external source and adapting it to the item. In certain assessments, a spoken response that incorporates such prepared material is treated as being plagiarized. In these assessments, a determination that a spoken response is plagiarized can result in various measures (e.g., any resulting score on the assessment or a speaking portion of the assessment may be treated as invalid, the user may be subject to disciplinary measures, etc.). However, it is often difficult even for trained human raters to recognize plagiarized spoken responses, due to the large number and variety of external sources from which the user can incorporate material. Therefore, there is a need for systems and methods for automatically detecting plagiarism in spoken responses that requires no human intervention or minimal human intervention.

Figure 1B:
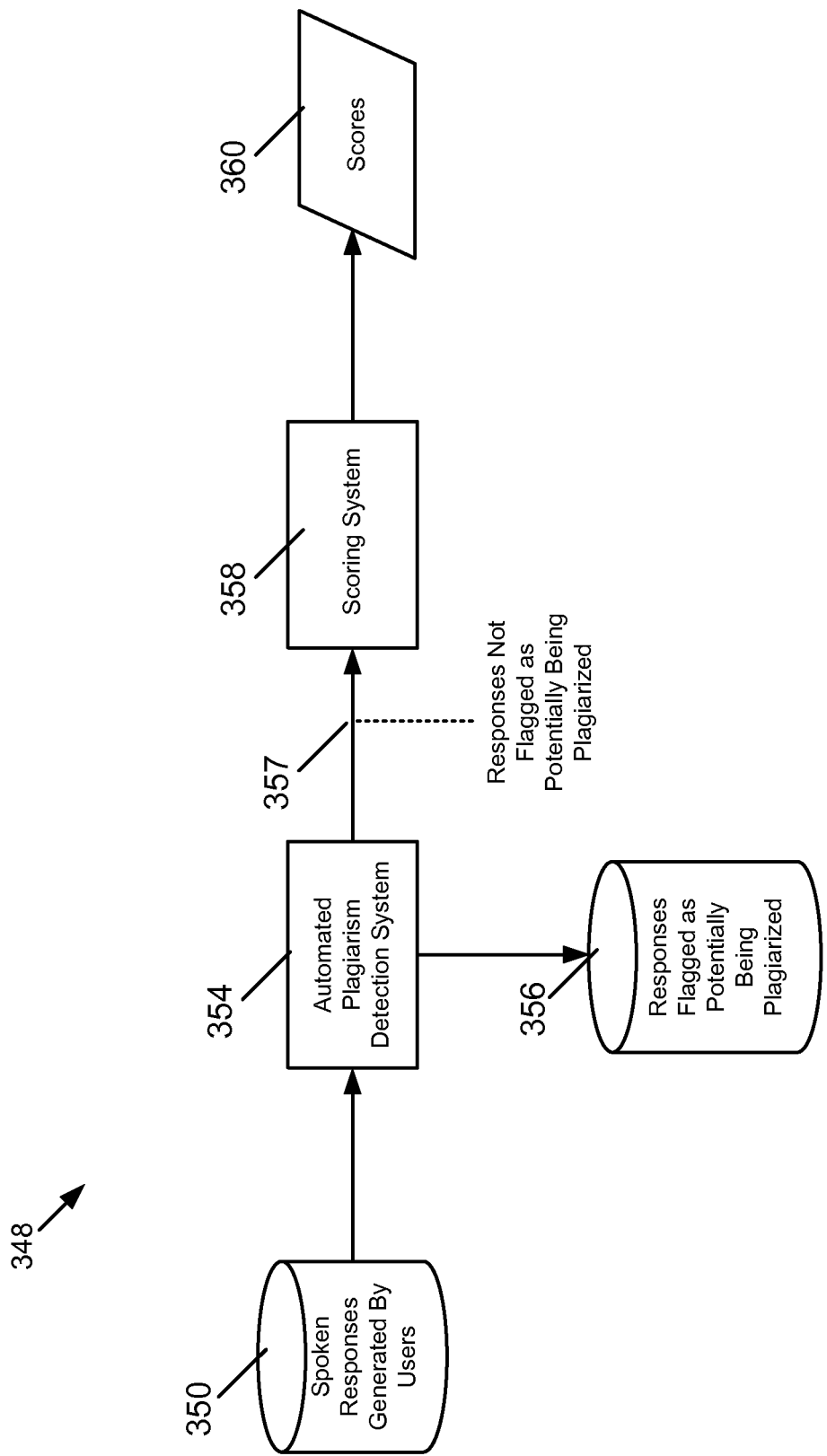
FIG. 1B is a block diagram illustrating use of an automated plagiarism detection system as an input filter to an automated scoring system.

In an example, an automated plagiarism detection system implemented according to the approaches described herein is utilized as an input filter to a scoring system. For example, as depicted in FIG. 1B, an automated plagiarism detection system 354 is configured to receive spoken responses 350 generated by users. Using the approaches described herein, the automated plagiarism detection system 354 classifies each of the responses 350 as being plagiarized or non-plagiarized. Responses 356 determined to be plagiarized are flagged as such, and actions may be taken based on the flagging of these responses 356 (e.g., the responses 356 may be reviewed by a human rater to verify the presence of plagiarized material, the responses 356 may be given scores of zero, etc.). Responses 357 determined to be non-plagiarized are passed to a scoring system 358, where the responses 357 are assigned scores 360 based on various criteria (e.g., the responses 357 may be scored based on the users' English-speaking proficiency, etc.).

With reference again to FIG. 1A, the spoken response 102 generated by the user is received at an automatic speech recognition (ASR) module 103 of the computer-based system, in an embodiment. The ASR module 103 may perform an automated speech recognition function, yielding a text 105 (e.g., a transcript) that is representative of the spoken response 102. The text 105 that is generated by the ASR module 103 may be accompanied by one or more confidence scores, each indicating a reliability of a recognition decision made by the ASR module 103. For example, a confidence score may be computed for recognized words of the spoken response 102 to indicate how likely it is that the word was correctly recognized. Confidence scores may also be computed at a phrase-level or a sentence-level.

In an example, the speech recognition performed by the ASR module 103 may be imperfect. Thus, the transcript 105 generated by the ASR module 103 may include one or more errors. For example, the ASR module 103 may do an imperfect job of discriminating between similar-sounding words. Errors in the transcript 105 may also be caused, for example, by audio noise included in the spoken response 102. An example output of the ASR module 103 is illustrated in FIG. 2B. This figure includes a transcript 206 of a spoken response, as generated by the ASR module 103. As illustrated in FIG. 2B, the transcript 206 comprises the text "well i remember when i i was in sixth grade there was a spelling bee kids from all classes um of the school competed again each of her i studied end studied for weeks and weeks when the day day of the contest came uh i was so completely end totally prepared um i was able to win the contest easily."

The transcript 206 generated by the ASR module 103 includes a number of recognition errors. For example, the transcript 206 includes the text "kids from all classes . . . of the school competed again each of her," but the words actually spoken in the response may have been "kids from all classes . . . competed against each other." The transcript 206 from the ASR module 103 includes various disfluencies (e.g., filler words, such as "um," "uh") and repeated words that were uttered by the user in creating the spoken response. Additionally, the transcript 206 does not contain sentence boundaries. As described in further detail below, the systems and methods described herein address these and other aspects of the ASR output (e.g., imperfect recognition, disfluencies included in the transcript, lack of sentence boundaries, etc.).

With reference again to FIG. 1A, the text 105 generated by the ASR output 103 is received at a text processing module 104 of the computer-based system, in an embodiment. Text processing performed on the text 105 at the text processing module 104 may include parsing the text 105 with a processing system to generate a set of individual words included in the text 105. The text processing performed on the text 105 at the text processing module 104 may further include processing the text 105 to remove disfluencies from the text 105. In an example, the disfluencies that may be removed from the text 105 include filled pauses, filler words (e.g., "um" and "uh"), recognized partial words, and repeated words, among others. The parsing and removal of disfluencies from the text 105 may be carried out using conventional automated, computer-based algorithms known to those of ordinary skill in the art.

The text processing performed on the text 105 at the text processing module 104 may also include processing the text 105 to identify in the text 105 a plurality of n-grams (e.g., unigrams, bigrams, and trigrams). The identification of the plurality of n-grams may be carried out using conventional automated, computer-based algorithms known to those of ordinary skill in the art.

The text processing performed on the text 105 at the text processing module 104 may further include processing the text 105 to identify in the text 105 a plurality of sentences. As explained above, the text 105 output by the ASR module 103 may not include sentence boundaries. Thus, the processing of the text 105 to identify the plurality of sentences in the text 105 may include (i) determining locations of one or more sentence boundaries in the text 105, and (ii) segmenting the text 105 into the plurality of sentences based on the one or more sentence boundaries. In an example, the sentence boundaries may be determined using a Maximum Entropy-based sentence boundary system that utilizes lexical features. Such a system for determining sentence boundaries is known to those of ordinary skill in the art and is described in "Detecting Structural Events for Assessing Non-Native Speech," by L. Chen and S. Yoon, Proceedings of the 6th Workshop on Innovative Use of NLP for Building Educational Applications, NAACL-HLT, pp. 38-45, Portland, Oreg. (Association for Computational Linguistics), which is incorporated herein by reference in its entirety.

Various other text processing and analysis may be performed on the text 105 at the text processing module 104. For example, the text 105 may be processed to normalize case in the text, and the plurality of sentences of the text 105 may be tokenized following the determination of the sentence boundaries. Such processing may be carried out using conventional automated, computer-based algorithms known to those of ordinary skill in the art.

An example of a processed text, as generated by the text processing module 104, is illustrated in FIG. 2C. The processed text 208 depicted in this figure corresponds to the ASR output 206 after having been processed by the text processing module 104. As illustrated in FIG. 2B, the processed text 208 comprises "Well I remember when I was in sixth grade there was a spelling bee. Kids from all classes of the school competed again each of her. I studied end studied for weeks and weeks. When the day of the contest came I was so completely end totally prepared I was able to win the contest easily." In the processed text 208, disfluencies have been removed, and the text has been segmented into sentences. In the example of FIG. 2C, word recognition errors (e.g., "I studied end studied . . . ") are still present in the processed text 208.

The text processing and analysis performed at the text processing module 104 is used to extract one or more features 108 from the text 105. In an example, the one or more features 108 include numerical measures or Boolean values that are representative of aspects of the spoken response 102 and/or the text 105. The text processing module 104 may extract example features 110 from the text 105, where the example features 110 include the first, second, and third features illustrated in FIG. 1A.

In extracting the example features 110, the text processing module 104 may utilize a source text 101. The source text 101 is text that has been designated as being a source of plagiarized content. The source text 101 may comprise a large number of individual writings or documents. As explained above, in responding to an item that elicits a spontaneous, spoken response, the user may attempt to memorize prepared material from an external source and adapt it to the item. The source text 101 may be an example of such an external source that has been identified as being used by users in their spoken responses. In some cases, users' spoken responses are nearly identical to an identified source. In other cases, several sentences or phrases of users' spoken responses are drawn from a particular source, although some modifications may be apparent.

An example of the source text 101 that has been designated as being a source of plagiarized content is illustrated in FIG. 3 (though not in connection with the content illustrated in FIG. 2C). As illustrated in the figure, an example source text 210 comprises: "Well, the place I enjoy the most is a small town located in France. I like this small town because it has very charming ocean view. I mean the sky there is so blue and the beach is always full of sunshine. You know how romantic it can ever be, just relax yourself on the beach, when the sun is setting down, when the ocean breeze is blowing and the seabirds are singing. Of course I like this small French town also because there are many great French restaurants. They offer the best seafood in the world like lobsters and tuna fishes. The most important, I have been benefited a lot from this trip to France because I made friends with some gorgeous French girls. One of them even gave me a little watch as a souvenir of our friendship." Responses identified as being plagiarized may contain extended sequences of words that directly match idiosyncratic features of the source text 210, such as the phrase "how romantic it can ever be" and "just relax yourself on the beach."

As explained above, the text processing module 104 may extract the example features 110 from the text 105 using the source text 101. As shown in FIG. 1A, the first example feature indicates a number of words and phrases of the text 105 that are included verbatim in the source text 101. The first feature may be determined by processing the text 105 with a processing system to determine a first numerical measure indicative of the number of words and phrases of the text 105 that are included verbatim in the source text 101 for the first feature. In an example, the first numerical measure is determined by comparing each of the n-grams extracted from the text 105 to n-grams of the source text 101. Such n-grams extracted from the text 105 and compared to n-grams of the source text 101 may be limited to unigrams, bigrams, and trigrams, in an example. In an example, the first example feature may be a "document-level" feature. A document-level feature, as referred to herein, is a feature that is determined based on comparisons of the text 105 to the source text 101 without consideration of sentence boundaries (e.g., in determining a document-level feature, the text 105 and the source text 101 may each be treated as a single sentence or simply as a sequence of words). Document-level features are described in further detail below.

The second example feature of the example features 110 indicates (i) an amount of the text 105 that paraphrases portions of the source text 101, or (ii) an amount of the text 105 that is semantically-similar to portions of the source text 101. The second feature is determined by comparing (e.g., aligning) units of text of the text 105 with corresponding units of text of the source text 101 to determine a second numerical measure for the second feature. FIG. 6D, described in further detail below, depicts aspects of an example alignment procedure that may be used in determining the second example feature. In such an alignment procedure, for each unit of text of the text 105 (e.g., each word and punctuation mark), a corresponding unit of text is determined in the source text 101. In an example, to automatically align the text 105 and the source text 101 (i.e., without human intervention or requiring only minimal human intervention), a machine translation metric is used. The machine translation metric may consider the text 105 and the source text 101 and determine a least number of edit operations that can be employed on the text 105 to transform the text 105 into the source text 101. Various other automated procedures for determining corresponding units of text in the text 105 and the source text 101 may be used in other examples. In an example, the second example feature may be a document-level feature.

The third example feature of the example features 110 is indicative of a similarity between sentences of the text 105 and sentences of the source text 101. In an example, the third feature is determined by processing (i) the plurality of sentences of the text 105 identified by the text processing module 104, and (ii) a plurality of sentences of the source text 101 with the processing system to determine a third numerical measure for the third feature. In an example, the processing includes comparing each sentence of the text 105 to each sentence of the source text 101 to determine the third numerical measure. The sentence-to-sentence comparisons may be used to generate values indicative of a degree of similarity between the compared sentences, and these values may be used to determine the third numerical measure.

The text processing module 104 may extract features other than the example features 110. The one or more features 108 extracted from the text 105 are received at a classification engine 112. The classification engine 112 includes an automated classification system configured to determine a classification 118 for the spoken response 102 that classifies the spoken response 102 as being plagiarized or non-plagiarized. The classification 118 may be a binary value (e.g., a value of 0 or 1 indicating that the spoken response 102 is plagiarized or not) or a probability (e.g., a probability of 75% that the spoken response 102 is plagiarized), for example. In an example, the automated classification system is a computer-based system for automatically classifying the spoken response 102 that requires no human intervention or minimal human intervention. The classification engine 112 may determine the classification 118 for the spoken response 102 based on the features 108 extracted from the spoken response 102 and a classification model. The classification model includes weighting factors for the extracted features 108, and the weighting factors are determined based on a plurality of human-classified reference responses 114.

The classification model may be a numerical model that is applied to the extracted features 108 to determine the classification 118. In an example, where the first, second, and third features 110 are extracted from the text 105, the classification model includes a first variable and an associated first weighting factor, a second variable and an associated second weighting factor, and a third variable and an associated third weighting factor. The first variable receives a value of the first feature, the second variable receives a value of the second feature, and the third variable receives a value of the third feature. By applying the classification model to the first, second, and third features in this manner, the classification 118 for the spoken response 102 is determined.

To generate the classification model used in the classification engine 112, a model generation module 106 may be used. The model generation module 106 receives the plurality of human-classified reference responses 114 with associated classifications (e.g., classifications that classify each of the reference responses 114 as being plagiarized or non-plagiarized) for each of the reference responses 114 and uses the plurality of human-classified reference responses 114 to determine the weighting factors for the model, e.g., through a regression analysis. In an example, the weighting factors of the classification model are determined via a machine learning application trained based on the plurality of human-classified reference responses 114. Specifically, the machine learning application may be a logistic regression classifier or another suitable machine learning application. In an example, the J48 decision tree model from the Weka machine learning toolkit may be trained using the plurality of human-classified reference responses 114 in conjunction the source text. As illustrated in FIG. 1A, the model generation module 106 provides the model to the classification engine 112.

Human-classified responses (e.g., such as the responses 114 of FIG. 1A) may be referred to herein as "reference responses." It should be appreciated that such "reference responses" are different from the "source texts" described herein. As referred to herein, a "source text" is a text that has been designated as being a source of plagiarized content. As explained above, in responding to an item that elicits a spontaneous, spoken response, the user may attempt to memorize prepared material from an external source and adapt it to the item. The source text 101 may be an example of such an external source that has been identified as being used by test-takers in their spoken responses. An example source text is illustrated in FIG. 3. By contrast, as referred to herein, a "reference response" is a textual or spoken response (i) that has been classified as being plagiarized or non-plagiarized, and (ii) that may be used in training a classification model (e.g., to determine the weighting factors of the classification model). In an example, the classification is assigned to the reference response by one or more human graders.

With the model in place, the spoken response 102 may be classified by applying the model as noted above. The classification 118 for the spoken response 102 classifies the spoken response 102 as being plagiarized or non-plagiarized. It should be appreciated that under the approaches described herein, one or more computer-based models are used in determining the classification 118 for the spoken response 102. As described above, such computer-based models are trained via a machine-learning application (e.g., a linear regression classifier, etc.) in order to determine weighting factors for the models. By contrast, conventional human classification techniques for classifying a spoken response as being plagiarized include none of these steps. Conventional human classification techniques involve one or more human classifiers listening to spoken responses (or reviewing transcripts of spoken responses) and manually determining if the responses appear to be plagiarized.

Figure 4:
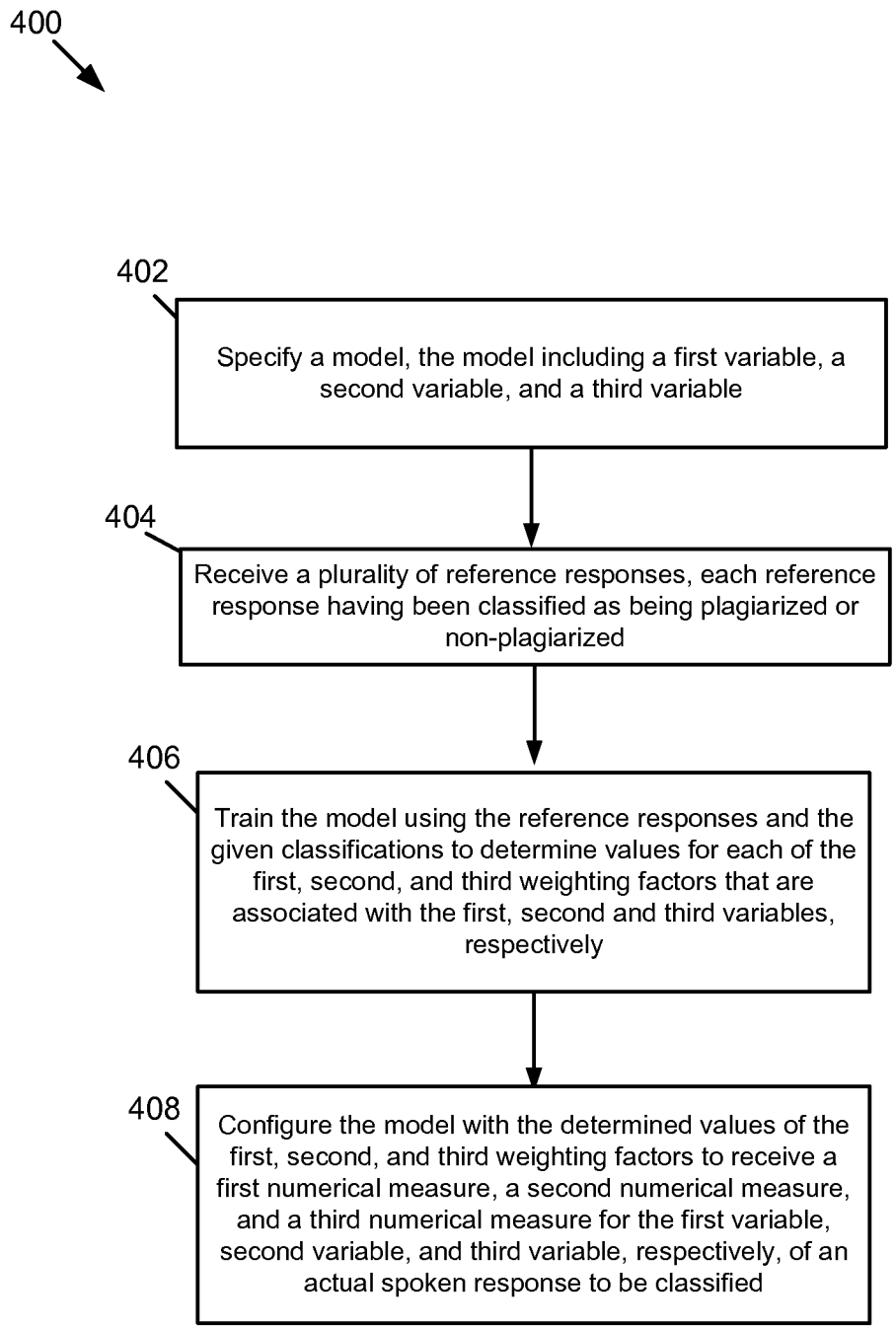
FIG. 4 is a flowchart depicting operations of an example method for constructing a model to classify a spoken response as being plagiarized or non-plagiarized.

FIG. 4 is a flowchart 400 depicting operations of an example method for constructing a model to classify a spoken response as being plagiarized or non-plagiarized. As described above with reference to FIG. 1A, a model generation module 106 receives the plurality of human-classified reference responses 114 (training responses) and uses the plurality of human-classified reference responses 114 to determine weighting factors of the model. The example operations depicted in the flowchart 400 of FIG. 4 provide further details on the building of such a model.

At 402, a model is specified. The model includes a first variable and an associated first weighting factor, the first variable indicative of a number of words and phrases of a first text (e.g., a transcript of a spoken response) that are included verbatim in a source text 122, as determined based on a comparison of n-grams of the first text to n-grams of the source text 122. The source text 122, which may be a collection of numerous documents and writings determined to have a significant likelihood of being sources of plagiarism, may have been designated as a source of plagiarized content. The model also includes a second variable and an associated second weighting factor, the second variable indicative of (i) an amount of the first text that paraphrases portions of the source text, or (ii) an amount of the first text that is semantically-similar to portions of the source text, as determined based on comparing units of text of the first text with corresponding units of text of the source text. The model further includes a third variable and an associated third weighting factor, the third variable indicative of a similarity between sentences of the first text and sentences of the source text, as determined based on a comparison of each sentence of the first text with each sentence of the source text. In other examples, the model includes additional variables and weighting factors, fewer variables and weighting factors, or different variables and weighting factors. For instance, the model may include variables and weighting factors that are based on one or more similarity metrics of the similarity metrics 552 of FIG. 5 (described in further detail below).

At 304, a plurality of reference responses are received, each reference response having been classified as being plagiarized or non-plagiarized. The reference responses may have been accepted as usable for training the model. In an example, the classifications given to the plurality of reference responses are assigned by one or more human classifiers. At 306, the model is trained with a processing system using the reference responses and the given classifications to determine values for each of the first, second, and third weighting factors. As explained above, in other examples, the model may include additional variables and weighting factors, fewer variables and weighting factors, or different variables and weighting factors. Thus, the training of the model is used to determine values for the particular weighting factors that are being used with the model, which may include the first, second, and third weighting factors or other weighting factors.

The training of the model may include processing each of the reference responses to determine for each reference response a first numerical measure, a second numerical measure, and a third numerical measure. The first numerical measure is indicative of a number of words and phrases of the reference response that are included verbatim in the source text. The second numerical measure is indicative of (i) an amount of the reference response that paraphrases portions of the source text, or (ii) an amount of the reference response that is semantically-similar to portions of the source text. The third numerical measure is indicative of a similarity between sentences of the reference response and sentences of the source text. In one example, the model may be a linear regression model comprising a linear combination of multiple, e.g., numerous, features (also called feature variables). The training of the model may include conducting a numerical regression analysis based on the first, second, and third numerical measures and the classification for each of the plurality of reference responses to determine the first, second, and third weighting factors. In another example, the training of the model may include conducting another suitable machine-learning analysis (e.g., a random forest learning analysis) based on the first, second, and third numerical measures and the classification for each of the plurality of reference responses to determine the first, second, and third weighting factors.

In an example, the model is trained using 239 reference responses that were classified by humans as being plagiarized and 1196 reference responses that were classified by humans as being non-plagiarized. The 239 reference responses classified as being plagiarized were taken from a data set of TOEFL iBT spoken responses that potentially contained plagiarized material. This data set contained responses that were flagged by humans as potentially containing plagiarized material and then subsequently reviewed by rater supervisors. In the review process performed by the rater supervisors, the responses of the data set were transcribed and compared to external source materials. If it was determined that the presence of plagiarized material made it impossible to provide a valid assessment of the test-taker's performance on the task, the response was assigned a score of 0. In an example, the data set of TOEFL iBT spoken responses included 719 responses that were flagged by humans as potentially containing plagiarized material, and the review process performed by the rater supervisors resulted in 239 responses that were assigned a score of 0 due to the presence of a significant amount of plagiarized content from an identified source. These 239 plagiarized responses are used in training the model in the example described above. In an example, the 239 plagiarized responses drew from 49 different source texts and were provided in response to 103 test items. Because it was not practical to obtain non-plagiarized responses for all of the 103 test items, approximately 300 non-plagiarized reference responses were extracted for each of the four test items that were most frequently represented in the 239 plagiarized reference responses. This resulted in the 1196 reference responses that were not plagiarized. In this example, the 239 plagiarized reference responses are on average longer than the 1196 non-plagiarized reference responses. This may be due to the fact that the plagiarized responses contain a large percentage of memorized material, which the test-takers are able to produce using a fast rate of speech since they had likely rehearsed the content several times before taking the assessment.

At 308, the model is configured with the determined values of the first, second, and third weighting factors. The model is then ready to be used for classifying new spoken responses, i.e., to receive a first numerical measure, a second numerical measure, and a third numerical measure for the first variable, second variable, and third variable, respectively, of an actual spoken response to be classified so as to generate a classification for the actual spoken response that classifies the response as being plagiarized or non-plagiarized. In this manner, the model is thereafter configured to perform automated classification on new spoken responses that need to be classified.

Figure 5:
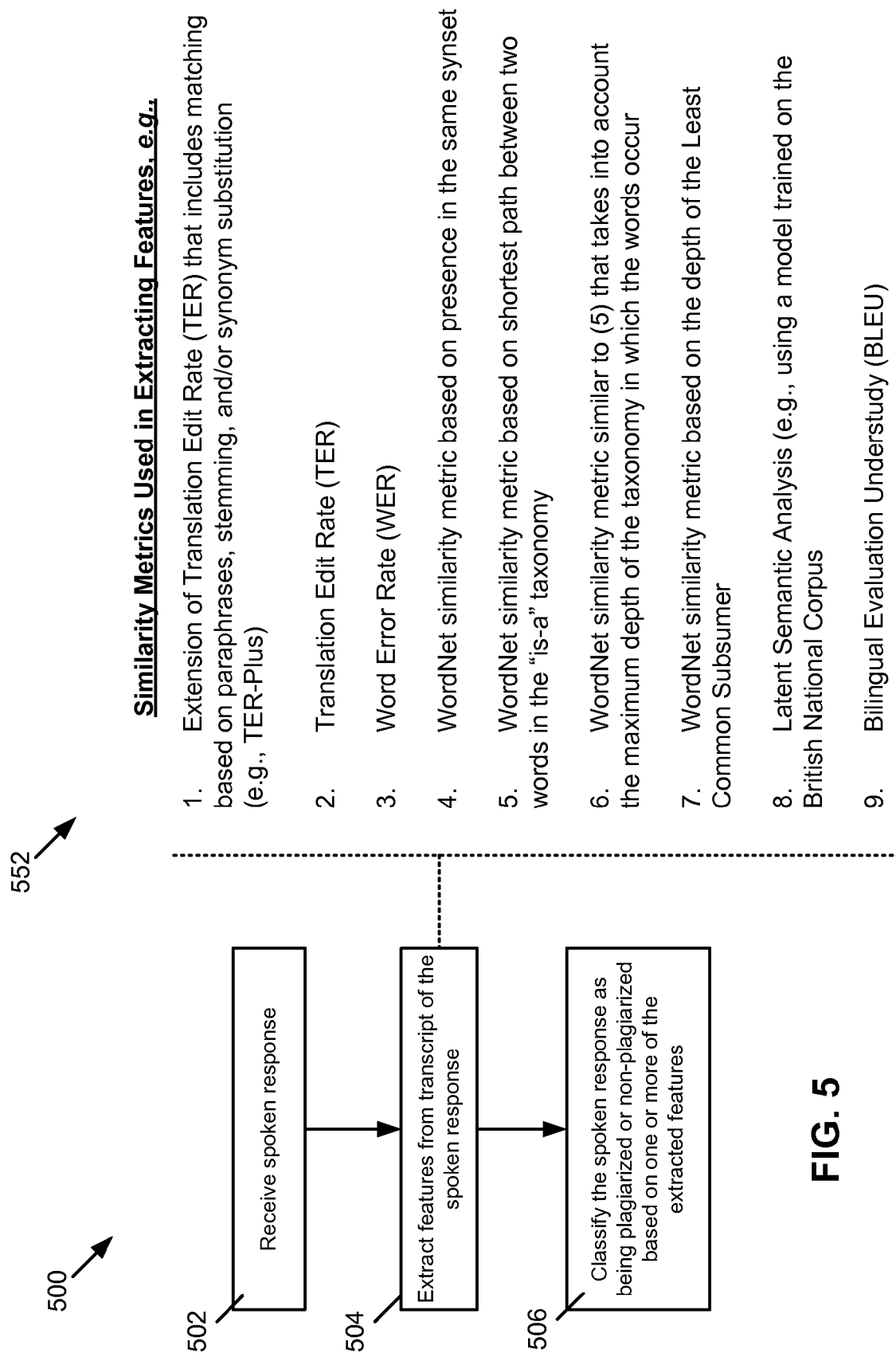
FIG. 5 depicts a flowchart including example steps for classifying a spoken response as being plagiarized or non-plagiarized.

FIG. 5 depicts a flowchart 500 including example steps for classifying a spoken response as being plagiarized or non-plagiarized. At 502, the spoken response is received. In an example, the spoken response is provided by a user in response to an item (e.g., a test question, task, etc.) that elicits a spontaneous, spoken response (i.e., a spoken response that has not been prepared in advance by the user). At 504, one or more features are extracted from the spoken response. The extracted features may be numerical measures that are determined by processing the spoken response and a source text, as described above with reference to FIG. 1A.

Figure 6A:
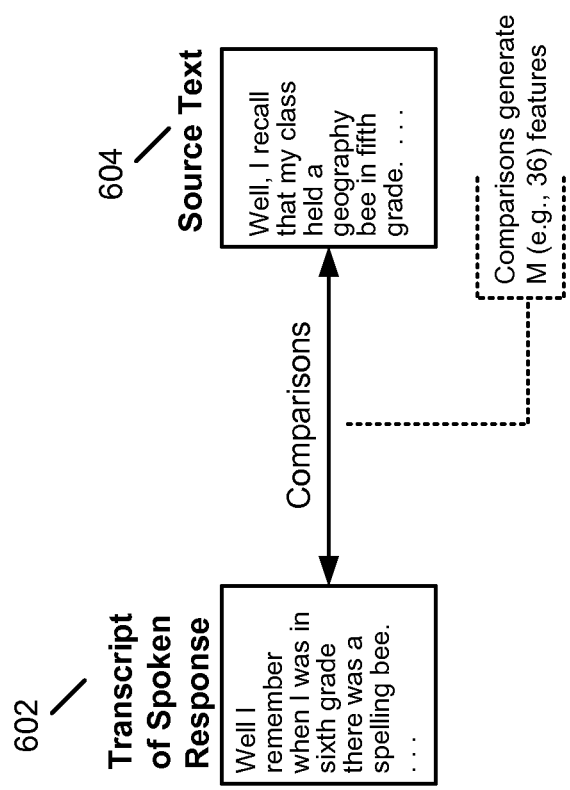
FIG. 6A depicts a comparison of a first text to a source text.

The one or more features may be extracted based on the example similarity metrics 552 of FIG. 5. The extraction of features from a spoken response may include (i) processing the spoken response with an ASR algorithm to generate a transcript of the spoken response, and (ii) comparing the transcript to one or more source texts that have been designated as being sources of plagiarized content, where the comparing may utilize one or more of the example similarity metrics 552 of FIG. 5. To illustrate this, reference is made to FIG. 6A. In FIG. 6A, a transcript 602 of a spoken response is compared to a source text 604 that has been designated as being a source of plagiarized content. As shown in the feature, comparisons between the transcript 602 and the source text 604 may be used to generate M (e.g., 36) features.

Examples of the M features that may be generated based on the comparisons of the transcript 602 to the source text 604 are shown in FIG. 6B. FIG. 6B is a table 670 that depicts M (e.g., 36) example features that may be generated based on comparisons of a transcript to a source text. As indicated in the table 670, a number (e.g., 9) of the M features are referred to herein as "document-level" features. The document-level features are features that are based on comparisons of the text of the transcript to the text of the source text without consideration of sentence boundaries (e.g., in the document-level features, the transcript and the source text may each be treated as a single sentence or simply as a sequence of words). The document-level features differ from the sentence-level features (described in further detail below) because the sentence-level features consider sentence boundaries in the transcript and source text.

Nine (9) document-level features may be extracted in an example, with each of the document-level features being based on a comparison of the transcript to the source text that utilizes one of the example similarity metrics 552 of FIG. 5. Thus, a first document-level feature may be based on a comparison of the transcript to the source text that utilizes the TER-Plus (TERp) similarity metric known to those of ordinary skill in the art. The first document-level feature may be indicative of (i) an amount of the transcript that paraphrases portions of the source text, and/or (ii) an amount of the transcript that is semantically-similar to portions of the source text. In utilizing the TER-Plus similarity metric to extract the first document-level feature, units of text of the transcript are aligned with corresponding units of text of the source text. The TER-Plus metric is described in "TERp: A system description," by Matthew Snover et al., Proceedings of the First NIST Metrics for Machine Translation Challenge (MetricsMATR), Waikiki, Hi. (October 2008), which is incorporated herein by reference in its entirety.

Figure 6C:
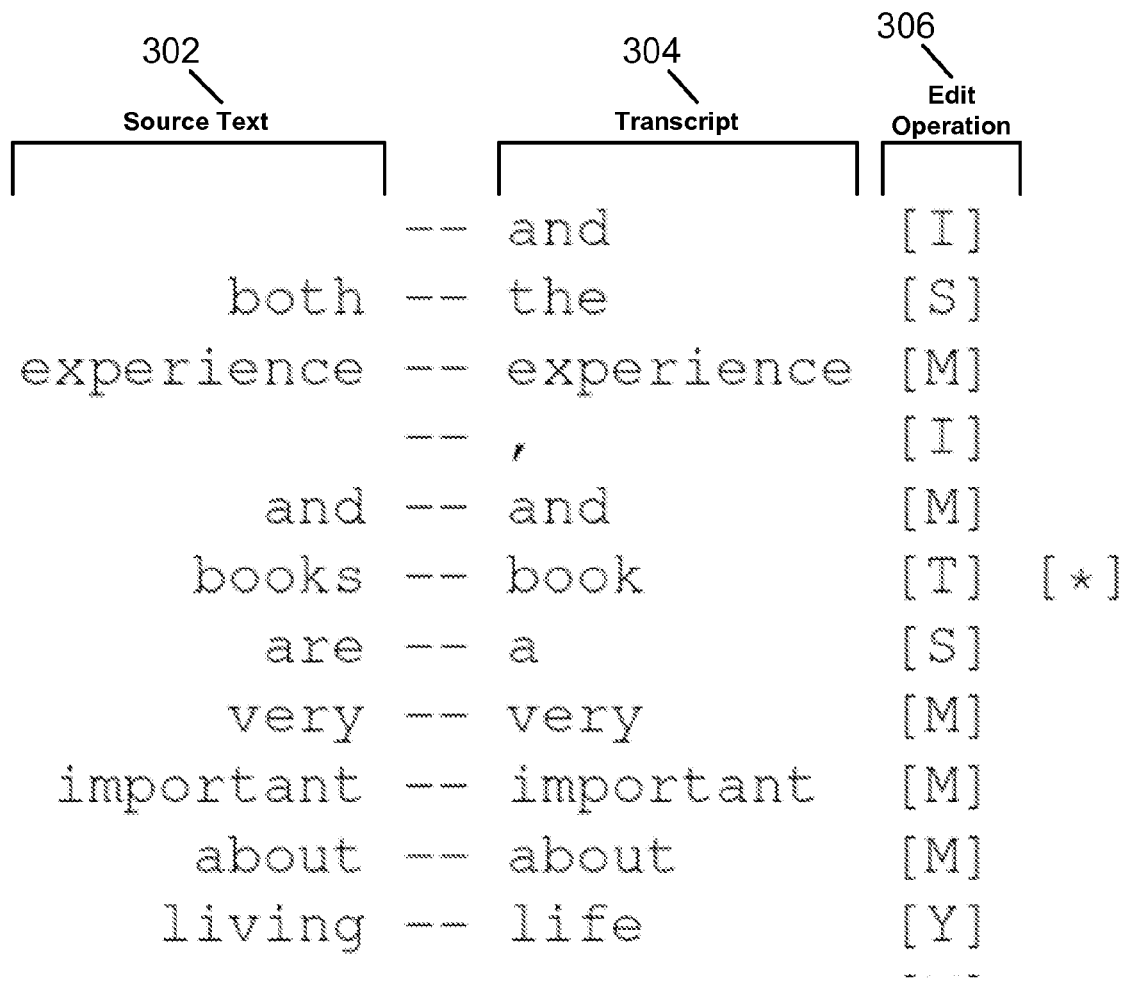
FIG. 6C depicts an alignment of units of text of a first text with corresponding units of text of a source text.

To illustrate use of the TER-Plus similarity metric in extracting the first document-level feature, reference is made to FIG. 6C. This figure depicts an alignment procedure performed between a source text 302 and a transcript 304, where units of text of the transcript 304 are aligned with corresponding units of text of the source text 302. The source text 302 of FIG. 6C represents a source text that has been designated as a source of plagiarized content. Specifically, the source text 302 includes the text "Both experience and books are very important about living." The transcript 304 aligned to the source text 302 in FIG. 6C includes the text "And the experience, and a very important book about life."

In the alignment procedure, for each unit of text of the source text 302 (e.g., each word and punctuation mark), a corresponding unit of text is determined in the transcript 304. In an example, to automatically align the source text 302 and the transcript 304 (i.e., without human intervention or requiring only minimal human intervention), the TER-Plus machine translation metric is used. The TER-Plus metric processes the source text 302 (e.g., treated as a single sentence) and the transcript 304 (e.g., treated as a single sentence) and determines a least number of edit operations that can be employed on the transcript 304 to transform the transcript 304 into the source text 302. Using the TER-Plus metric, in determining the least number of edit operations, an alignment is produced between the source text 302 and the transcript 304, such that for each unit of text in the source text 302, a corresponding unit of text in the transcript 304 is determined. As depicted in the example alignment of FIG. 6C, in determining the corresponding units of text in the transcript 304, an order of words or phrases in the transcript 304 may be shifted in order to allow for a better alignment with the source text 302 or to obtain a smaller edit cost, as determined by the TER-Plus metric. For instance, as indicated by the asterisk near the word "book" of the transcript 304, the word "book" is placed in a different location in the aligned transcript 304 as compared to its location in the original transcript.

In FIG. 6C, each alignment link between the source text 302 and the transcript 304 is associated with an edit operation 306. The edit operations 306 of FIG. 6C include certain of the edit operations considered in the TER-Plus metric (i.e., those edit operations considered in the TER-Plus metric in determining the least number of edit operations that can be employed to transform the transcript 304 into the original sequence 302). Specifically, the edit operations considered by the TER-Plus metric may include matches (denoted by the letter "M" in the edit operations 306 of FIG. 6C), substitutions (denoted by the letter "S"), insertions (denoted by the letter "I"), deletions (not depicted in the example alignment procedure of FIG. 6C), paraphrase substitutions (not depicted in the example alignment procedure of FIG. 6C), synonym matches (denoted by the letter "Y" in FIG. 6C), and stem matches (denoted by the letter "T"). Additionally, in FIG. 6C, the asterisk next to the word "book" denotes that the TER-Plus metric shifted the position of the word "book" before computing an edit operation for the word.

The match operation in TER-Plus is used to indicate an exact, identical match between the source text 302 and the transcript 304. For example, in FIG. 6C, the word "experience" from the source text 302 exactly matches the word "experience" from the transcript 304. The substitution operation in TER-Plus substitutes a word of the source text 302 with a different word of the transcript 304. In FIG. 6C, for instance, the word "the" from the transcript 304 is substituted for the word "both" of the source text 302. The insertion operation in TER-Plus causes the transcript 304 to have an additional unit of text that does not correspond to a unit of text of the source text 302. In FIG. 6C, the word "and" at the beginning of the transcript 304 does not have a corresponding unit of text in the source text 302. The deletion operation in TER-Plus deletes a unit of text of the source text 302, such that the deleted unit of text is not aligned to a unit of text in the transcript 304.

The paraphrase substitution operation in TER-Plus (also known as a "phrase substitution") aligns units of text in the source text 302 and the transcript 304 if the units of text are paraphrases of each other. The synonym match operation in TER-Plus aligns units of text in the source text 302 and the transcript 304 if the units of text are synonyms of each other. In FIG. 6C, for instance, the words "living" and "life" from the source text 302 and the transcript 304, respectively, are determined to be synonyms and are thus aligned based on the synonym match operation. The stem match operation in TER-Plus aligns units of text in the source text 302 and the transcript 304 if the units of text share a same stem. In FIG. 6C, for instance, the words "books" and "book" from the source text 302 and the transcript 304, respectively, are determined to share a same stem and are thus matched based on the stem match operation.

A second document-level feature may be based on a comparison of the transcript to the source text that utilizes the Translation Edit Rate (TER) similarity metric known to those of ordinary skill in the art. Like the first document-level feature, the second document-level feature may be indicative of (i) an amount of the transcript that paraphrases portions of the source text, and/or (ii) an amount of the transcript that is semantically-similar to portions of the source text. In utilizing the TER similarity metric to extract the second document-level feature, units of text of the transcript are automatically aligned (i.e., without human intervention or requiring only minimal human intervention) with corresponding units of text of the source text in a manner similar to that described above for the TER-Plus similarity metric. Like the TER-Plus metric, the TER metric processes the source text (e.g., treated as a single sentence) and the transcript (e.g., treated as a single sentence) and determines a least number of edit operations that can be employed on the transcript to transform the transcript into the source text. The TER metric may differ from the TER-Plus metric because the TER metric does not utilize the paraphrase substitution operations, synonym substitution operations, and stem match operations that are utilized in the TER-Plus metric. The TER metric is described in "A study of translation edit rate with targeted human annotation," by Matthew Snover et al., Proceedings of Association for Machine Translation in the Americas, pages 223-231 (2006), which is incorporated herein by reference in its entirety.

A third document-level feature may be based on a comparison of the transcript to the source text that utilizes the Word Error Rate (WER) similarity metric known to those of ordinary skill in the art. Like the first and second document-level features, the third document-level feature may be indicative of (i) an amount of the transcript that paraphrases portions of the source text, and/or (ii) an amount of the transcript that is semantically-similar to portions of the source text. In utilizing the WER similarity metric to extract the third document-level feature, units of text of the transcript are automatically aligned (i.e., without human intervention or requiring only minimal human intervention) with corresponding units of text of the source text in a manner similar to that described above for the TER-Plus and TER similarity metrics. Like the TER-Plus and TER metrics, the WER metric processes the source text (e.g., treated as a single sentence) and the transcript (e.g., treated as a single sentence) and determines a least number of edit operations that can be employed on the transcript to transform the transcript into the source text. The WER metric may differ from the TER metric because the TER metric allows shifts of words within the text at a lower edit cost as compared to the WER metric. The WER metric may differ from the TER-Plus metric because the WER metric does not utilize the paraphrase substitution operations, synonym substitution operations, and stem match operations that are utilized in the TER-Plus metric.

A fourth document-level feature may be based on a comparison of the transcript to the source text that utilizes a WordNet similarity metric based on a presence in a same synset. The WordNet lexical database is known to those of ordinary skill in the art. The fourth document-level feature may be indicative of (i) an amount of the transcript that paraphrases portions of the source text, and/or (ii) an amount of the transcript that is semantically-similar to portions of the source text. In utilizing the WordNet similarity metric based on a presence in a same synset to extract the fourth document-level feature, word-to-word comparisons are performed between words of the transcript (e.g., treated as a single sentence) and words of the source text (e.g., treated as a single sentence), and a similarity between the compared words is determined. To determine the similarity between the compared words, each of the compared words is searched across the WordNet hierarchy. Words that are closer in the WordNet hierarchy are more semantically-similar, and words that are farther apart in the WordNet hierarchy are less semantically-similar. Based on the similarities of the compared words, an overall similarity of the transcript to the source text is determined.

A fifth document-level feature may be based on a comparison of the transcript to the source text that utilizes a WordNet similarity metric based on the shortest path between two words in the "is-a" taxonomy. A sixth document-level feature may be based on a comparison of the transcript to the source text that utilizes a WordNet similarity metric based on the shortest path between two words in the "is-a" taxonomy that also takes into account the maximum depth of the taxonomy in which the words occur. This similarity metric is described in "Combining local context and wordnet similarity for word sense identification," by Claudia Leacock et al., in WordNet: An Electronic Lexical Database, pages 305-332 (MIT Press 1998), which is incorporated herein by reference in its entirety. A seventh document-level feature may be based on a comparison of the transcript to the source text that utilizes a WordNet similarity metric based on the depth of the Least Common Subsumer of two words. This similarity metric is described in "Verb semantics and lexical selection," by Zhibiao Wu et al., in Proceedings of the 32nd Annual Meeting of the Association for Computational Linguistics (ACL) (1994), which is incorporated herein by reference in its entirety. The fifth, sixth, and seventh document-level features may each be indicative of (i) an amount of the transcript that paraphrases portions of the source text, and/or (ii) an amount of the transcript that is semantically-similar to portions of the source text.

An eighth document-level feature may be based on a comparison of the transcript to the source text that utilizes a Latent Semantic Analysis (LSA) similarity metric (e.g., using a model trained on the British National Corpus) known to those of ordinary skill in the art. The eighth document-level feature may be indicative of (i) an amount of the transcript that paraphrases portions of the source text, and/or (ii) an amount of the transcript that is semantically-similar to portions of the source text. In utilizing the LSA similarity metric, word-to-word comparisons are performed between words of the transcript (e.g., treated as a single sentence) and words of the source text (e.g., treated as a single sentence), and a similarity between the compared words is determined. The similarity between the compared words is determined based on a co-occurrence of the words in a large external corpus of text (e.g., the British National Corpus). Based on the similarities of the compared words, an overall similarity of the transcript to the source text is determined.

A ninth document-level feature may be based on a comparison of the transcript to the source text that utilizes the Bilingual Evaluation Understudy (BLEU) similarity metric known to those of ordinary skill in the art. The ninth document-level feature may be indicative of a number of words and phrases of the transcript that are included verbatim in the source text. As described above with reference to FIG. 1A, in the approaches described herein, the transcript may be processed to identify a plurality of n-grams in the transcript. In an example, the identified n-grams are unigrams, bigrams, and trigrams. In determining the ninth document-level feature based on the BLEU similarity metric, each of the identified n-grams of the transcript may be compared to n-grams of the source text. Stated another way, the ninth document-level feature may be a precision metric that computes n-gram overlap (e.g., n=1, 2, 3) between the transcript (treated as a single sentence) and the source text (treated as a single sentence) based on the BLEU algorithm, which measures how many words and phrases are copied directly from the source text into the transcript. The BLEU metric is described in "BLEU: A method for automatic evaluation of machine translation," by Kishore Papineni et al., In Proceedings of the 40th Annual Meeting of the Association for Computational Linguistics (2002), which is incorporated herein by reference in its entirety.

As described above, the nine example similarity metrics 552 illustrated in FIG. 5 may be used to extract the nine document-level features shown in the table 670 of FIG. 6B. The table 670 of FIG. 6B further shows that for each of the nine example similarity metrics, three "sentence-level" features may be extracted based on comparisons of a transcript of a spoken response to a source text. As described above with reference to FIG. 1A, in the approaches described herein, the transcript may be processed to identify a plurality of sentences in the transcript. In extracting the sentence-level features described herein, the identified sentences of the transcript are compared to sentences of the source text in sentence-to-sentence comparisons. The sentence-level features thus differ from the document-level features described above, which do not take into account sentences in comparing the transcript to the source text.

Figure 7A:
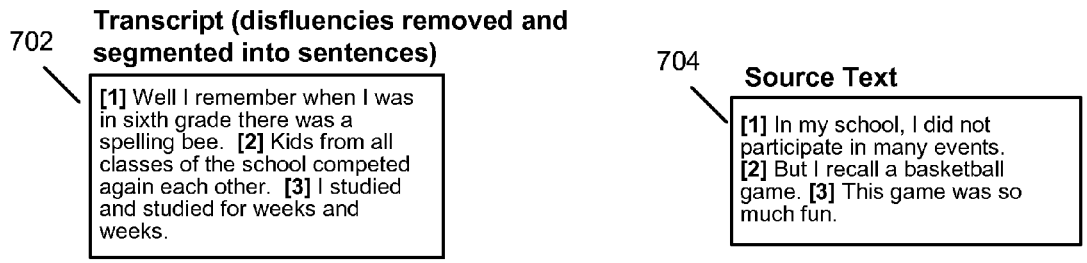
FIG. 7A depicts a response text that includes three sentences and a source text that also includes three sentences.
Figure 7B:
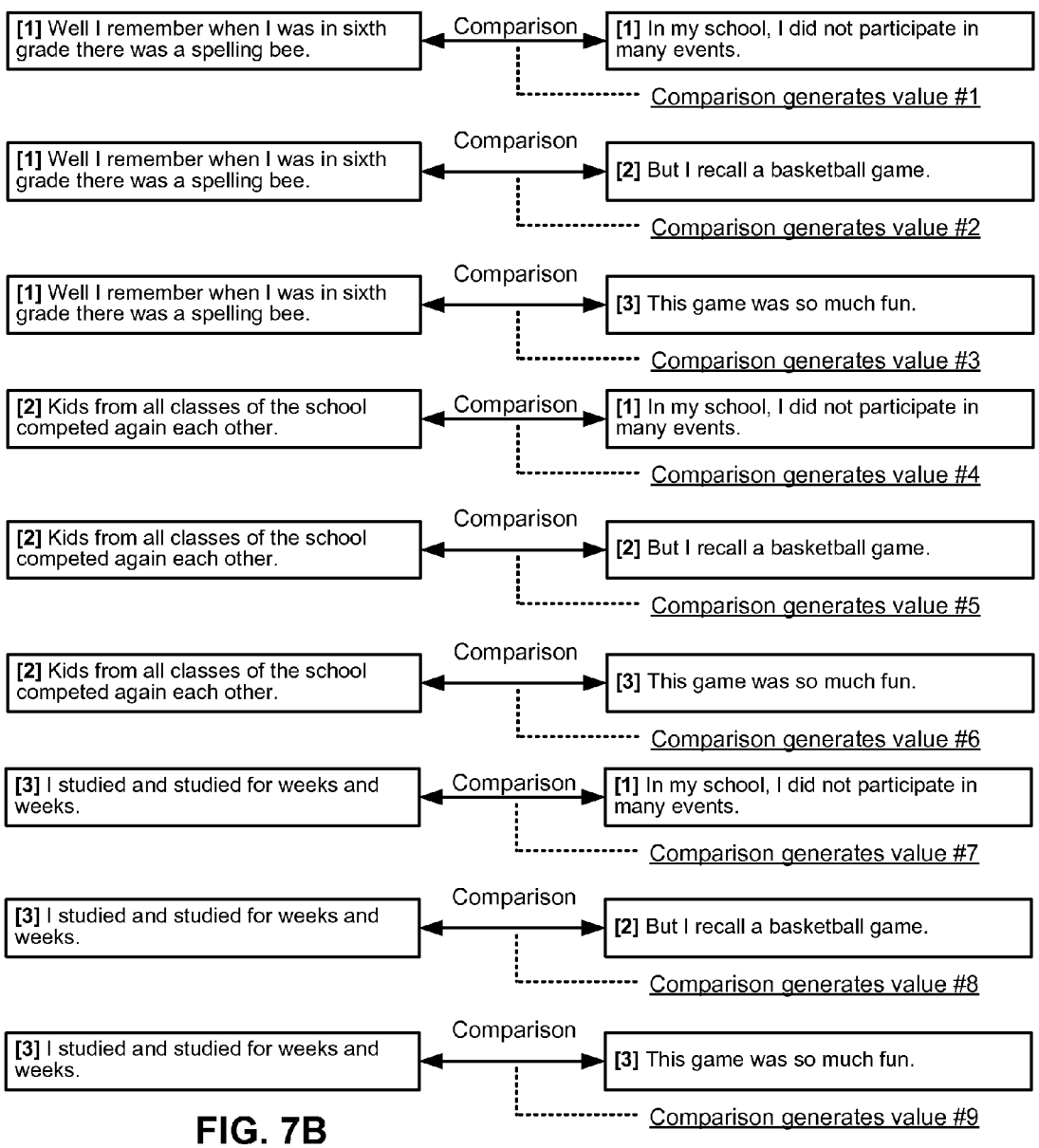
FIG. 7B depicts a comparison of each sentence of the response text of FIG. 7A to each sentence of the source text.

To illustrate the extraction of three sentence-level features using the TER-Plus similarity metric, reference is made to FIGS. 7A and 7B. FIG. 7A illustrates a transcript 702 of a spoken response. The transcript 702 has been processed to remove disfluencies in the transcript 702 and to identify sentences in the transcript 702. Three sentences have been identified in the example transcript 702. FIG. 7A further illustrates a source text 704 that has been designated as a source of plagiarized content. The source text 704 includes three sentences in the example of FIG. 7A. To extract the three sentence-level features using the TER-Plus similarity metric, each sentence of the transcript 702 is compared to each sentence of the source text 704 in a sentence-to-sentence comparison.

The comparison of each sentence of the transcript 702 to each sentence of the source text 704 is illustrated in FIG. 7B. As shown in the figure, the first sentence of the transcript 702 is compared to each of the three sentences of the source text 704, the second sentence of the transcript 702 is compared to each of the three sentences of the source text 704, and so on. To extract the three sentence-level features using the TER-Plus similarity metric, each of the comparisons utilizes the TER-Plus similarity metric, and each of the comparisons generates a value indicative of a degree of similarity between the compared sentences. The use of the TER-Plus similarity metric to compare a transcript to a source text was described above with reference to the document-level feature extracted based on the TER-Plus similarity metric. The TER-Plus similarity metric is used in a similar manner in each of the sentence-to-sentence comparisons.

In the example of FIGS. 7A and 7B, after making the nine sentence-to-sentence comparisons and generating the nine values, the three sentence-level features based on the TER-Plus similarity metric may be determined. The first sentence-level feature based on the TER-Plus similarity metric may be a maximum value of the nine generated values. The second sentence-level feature based on the TER-Plus similarity metric may be an average of the nine generated values. The third sentence-level feature based on the TER-Plus similarity metric may be determined by (i) determining, for each sentence of the transcript 702, a maximum sentence value, where the maximum sentence value is a maximum value of a subset of the nine generated values, the subset including values generated based on the comparison of the sentence to the sentences of the source text 704, and (ii) determining an average of the maximum sentence values, where the average of the maximum sentence values is the third sentence-level feature.

The extraction of three sentence-level features using each of the other eight similarity metrics of FIG. 5 may be performed in a similar manner. For example, to extract three sentence-level features using the TER similarity metric, reference is again made to FIGS. 7A and 7B. To extract the three sentence-level features using the TER similarity metric, each sentence of the transcript 702 is compared to each sentence of the source text 704 in a sentence-to-sentence comparison. Each of the comparisons utilizes the TER similarity metric, and each of the comparisons generates a value indicative of a degree of similarity between the compared sentences. After making the nine sentence-to-sentence comparisons using the TER similarity metric and generating the nine values, the three sentence-level features based on the TER similarity metric may be determined. The first sentence-level feature based on the TER similarity metric may be a maximum value of the nine generated values. The second sentence-level feature based on the TER similarity metric may be an average of the nine generated values. The third sentence-level feature based on the TER similarity metric may be determined by (i) determining, for each sentence of the transcript 702, a maximum sentence value, where the maximum sentence value is a maximum value of a subset of the nine generated values, the subset including values generated based on the comparison of the sentence to the sentences of the source text 704, and (ii) determining an average of the maximum sentence values, where the average of the maximum sentence values is the third sentence-level feature.

Figure 7C:
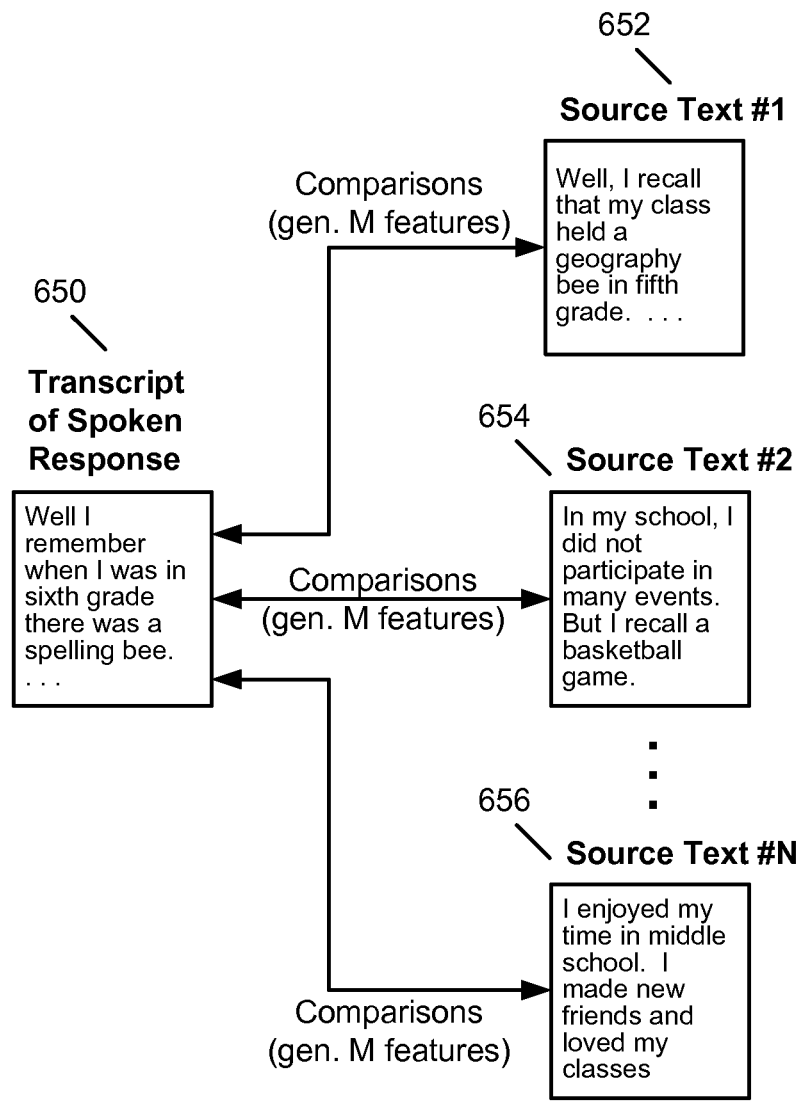
FIG. 7C depicts a comparison of a first text to a plurality of source texts.

The description above describes the extraction of M (e.g., 36) features based on comparisons of a transcript of a spoken response to a source text. This is shown in FIG. 6A, which illustrates that the comparisons of the two texts generate M features. In extracting features for (i) training a model (e.g., as performed by the model generation module 106 of FIG. 1A, described above), or (ii) classifying a response as being plagiarized or non-plagiarized (e.g., as performed by the text processing module of 104 of FIG. 1A, described above), a text may be compared to multiple source texts. This is shown in FIG. 7C, which illustrates a transcript 650 being compared to multiple source texts 652, 654, 656. The comparisons of the transcript 650 to the source text 652 may be used to generate M (e.g., 36) features, the comparisons of the transcript 650 to the source text 654 may be used to generate M additional features, and so on. In the example described above, where 49 source texts are designated as being sources of plagiarized content, a text may be compared to each of these 49 source texts to generate M*49 features. These features may be used in training a model or classifying a response as being plagiarized or non-plagiarized, as described herein.

Thus, with reference again to FIG. 5, a total number of features extracted at step 504 may be M*N, where M is the number of features extracted based on comparisons of a transcript to a single source text, and N is the number of source texts used. Additional similarity metrics and features not described above may be used in other examples. In other examples, a smaller number of similarity metrics and/or features may be used. At 506, a classification for the spoken response is determined using the model based on the one or more extracted features. The classification classifies the spoken response as being plagiarized or non-plagiarized.

As described above, a transcript of a spoken response generated by an ASR system may be imperfect. For example, the ASR system may do an imperfect job of discriminating between similar-sounding words, causing the transcript to include one or more recognition errors. In an example, in extracting the document-level and sentence-level features from a transcript, confidence scores generated by the ASR system may be utilized. As described above, the transcript that is generated by the ASR system may be accompanied by one or more confidence scores, each indicating a reliability of a recognition decision made by the ASR system (e.g., confidence scores may be determined for recognized words and phrases in the transcript). In this example, the confidence scores may be used in extracting the document-level and sentence-level features described above. Specifically, in comparing text of the transcript to text of the source text, more weight may be placed on comparisons involving transcript features (e.g., words) that are associated with higher confidence scores. Conversely, less weight may be placed on comparisons involving transcript features that are associated with lower confidence scores. For example, in extracting a feature using the BLEU similarity metric, where the extracted feature indicates a number of words and phrases of a transcript that are included verbatim in a source text, a weighted summation of scores may be used. Each of the scores may be indicative of whether a word or phrase of the transcript is included in the source text, and weights utilized in the weighted summation may be based on confidence scores associated with the word or phrase.

Figure 8:
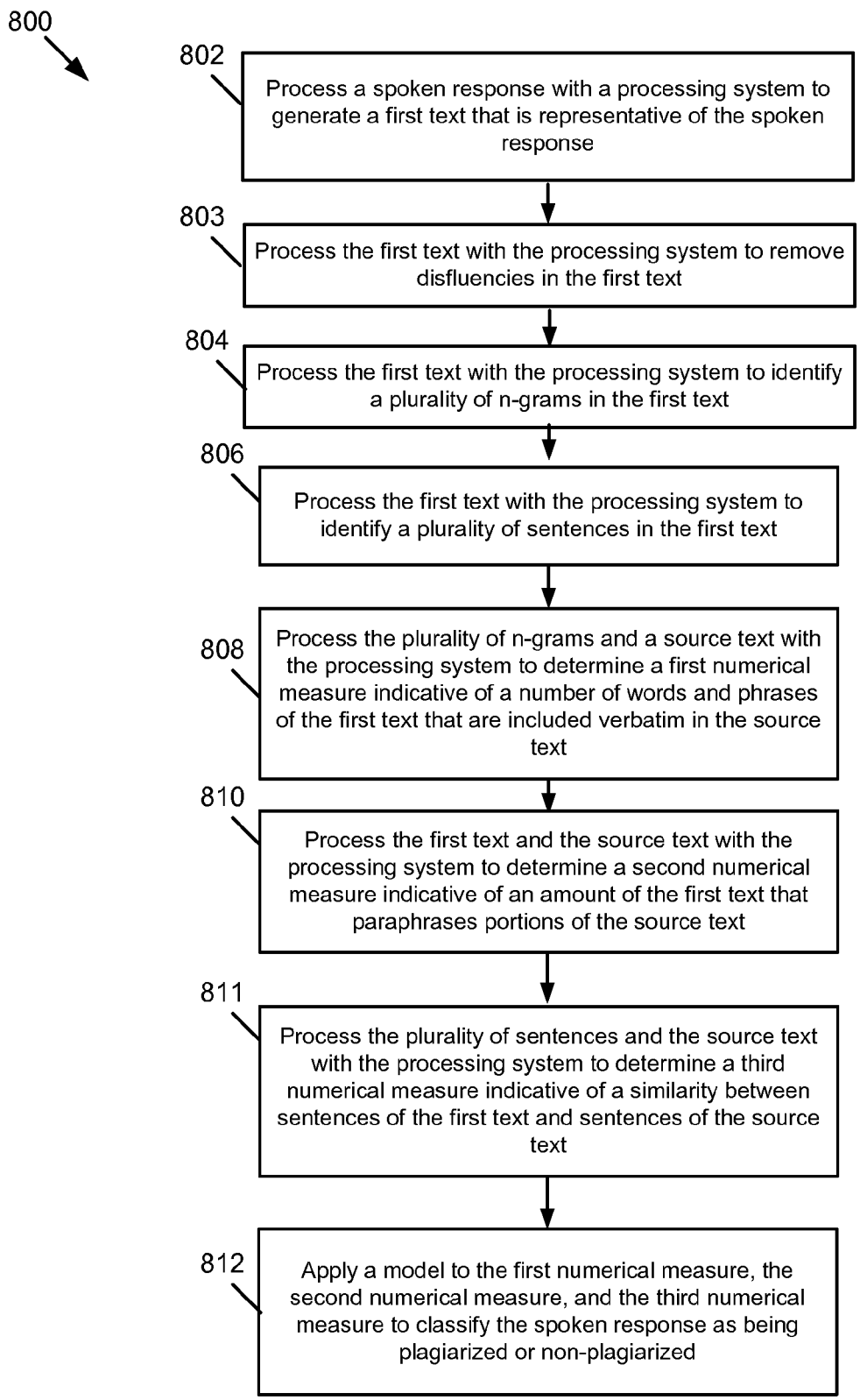
FIG. 8 is a flowchart depicting operations of an example computer-implemented method of classifying a spoken response as being plagiarized or non-plagiarized.

FIG. 8 is a flowchart 800 depicting operations of an example computer-implemented method of classifying a spoken response as being plagiarized or non-plagiarized. At 802, a spoken response is processed with a processing system to generate a first text that is representative of the spoken response. At 803, the first text is processed with the processing system to remove disfluencies in the first text. At 804, the first text is processed with the processing system to identify a plurality of n-grams in the first text. At 806, the first text is processed with the processing system to identify a plurality of sentences in the first text.

At 808, the plurality of n-grams and a source text are processed with the processing system to determine a first numerical measure indicative of a number of words and phrases of the first text that are included verbatim in the source text. Each of the n-grams is compared to n-grams of the source text to determine the first numerical measure. The source text has been designated as a source of plagiarized content. At 810, the first text and the source text are processed with the processing system to determine a second numerical measure indicative of (i) an amount of the first text that paraphrases portions of the source text, or (ii) an amount of the first text that is semantically-similar to portions of the source text. The second numerical measure is determined by comparing units of text of the first text with corresponding units of text of the source text. At 811, the plurality of sentences and the source text are processed with the processing system to determine a third numerical measure indicative of a similarity between sentences of the first text and sentences of the source text. Each sentence of the plurality of sentences is compared to each sentence of the source text to determine the third numerical measure.

At 812, a model is applied to the first numerical measure, the second numerical measure, and the third numerical measure to classify the spoken response as being plagiarized or non-plagiarized. The model includes a first variable and an associated first weighting factor, the first variable receiving a value of the first numerical measure. The model also includes a second variable and an associated second weighting factor, the second variable receiving a value of the second numerical measure. The model further includes a third variable and an associated third weighting factor, the third variable receiving a value of the third numerical measure.

The computerized approaches described herein for analyzing content for its likelihood of being plagiarized, which utilize, e.g., various computer models trained according to reference data, are very different from conventional human assessment of plagiarized content. In conventional human assessment of plagiarized content, a human grader observes reviews a student's or test taker's content and makes a holistic, mental judgment about whether that content may have been plagiarized based on that human scorer's own familiarity with other content and a subjective sense that the content may not be that of the student. Those initial determinations may then result in further follow-up and verification to determine whether any content appears to have indeed been plagiarized. Conventional human assessment of plagiarism does not involve the use of the computer models, associated variables, training of the models based on reference data to calculate weights of various features or variables, transforming observed data based on such models, representing such processed data with suitable data structures, and applying the computer models to such data structures to score content for its likelihood of plagiarism, as described herein. Moreover, conventional human assessment of plagiarism may suffer from inconsistency in scoring from one human scorer to another, and/or may suffer from inconsistency in assessment even with the same human scorer from one day to the next. The approaches described herein may not suffer from such deficiencies.

Figure 9A:
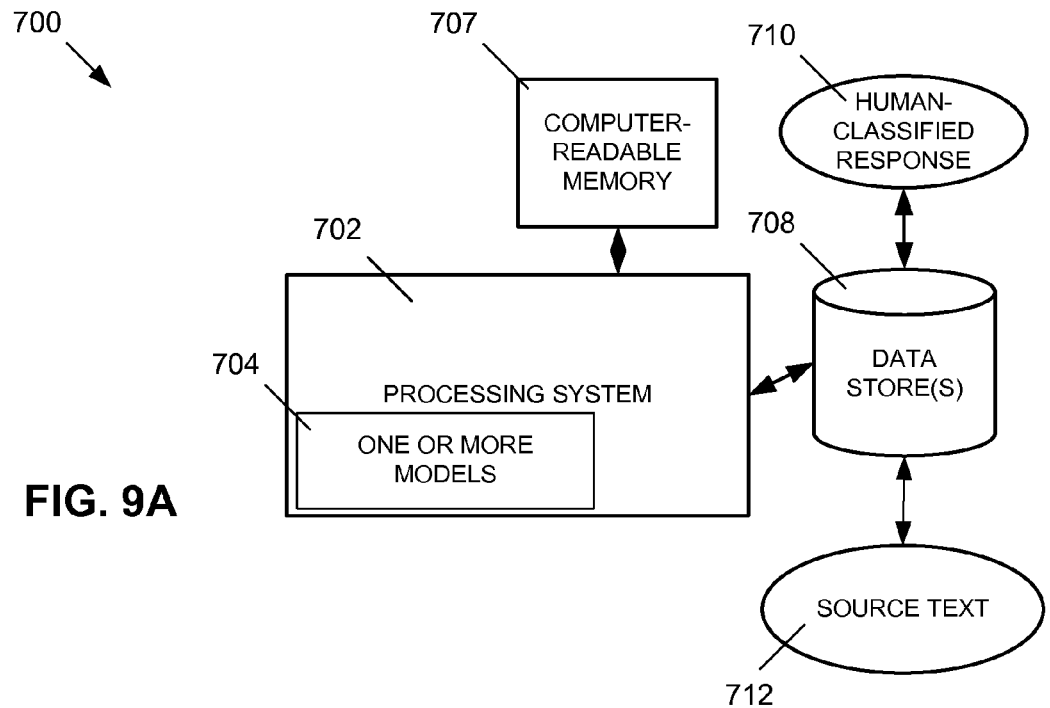
FIGS. 9A, 9B, and 9C depict example systems for classifying a spoken response as being plagiarized or non-plagiarized.
Figure 9B:
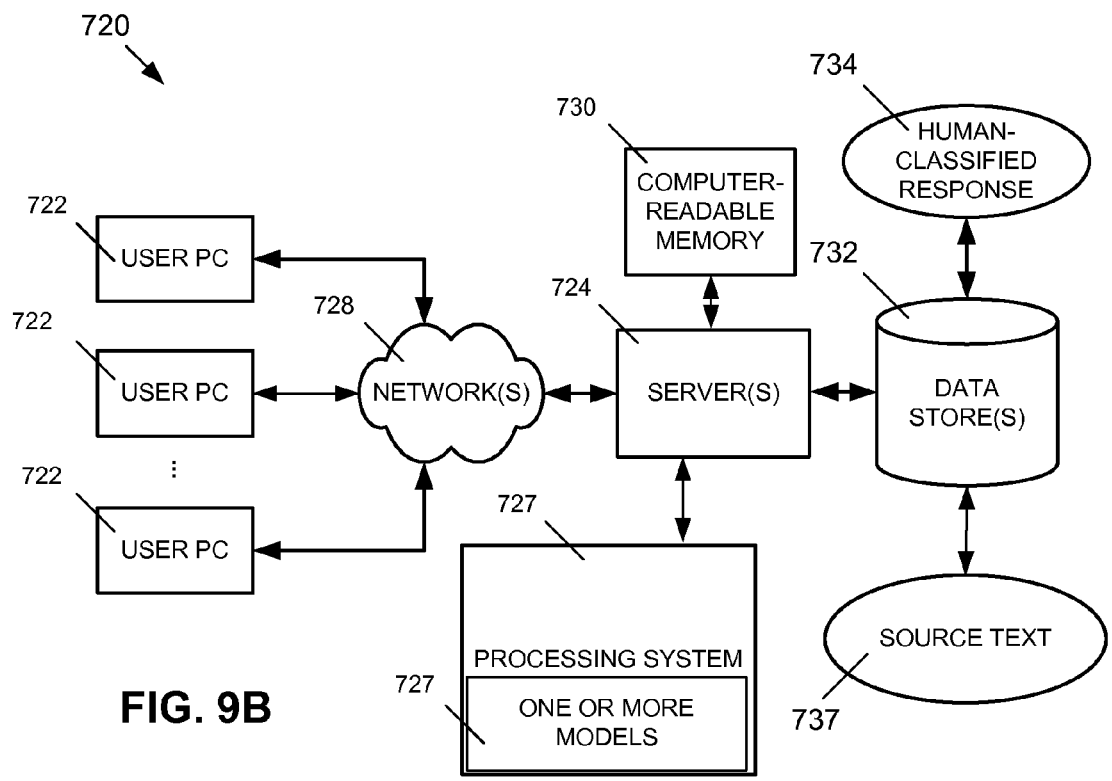
Figure 9C:
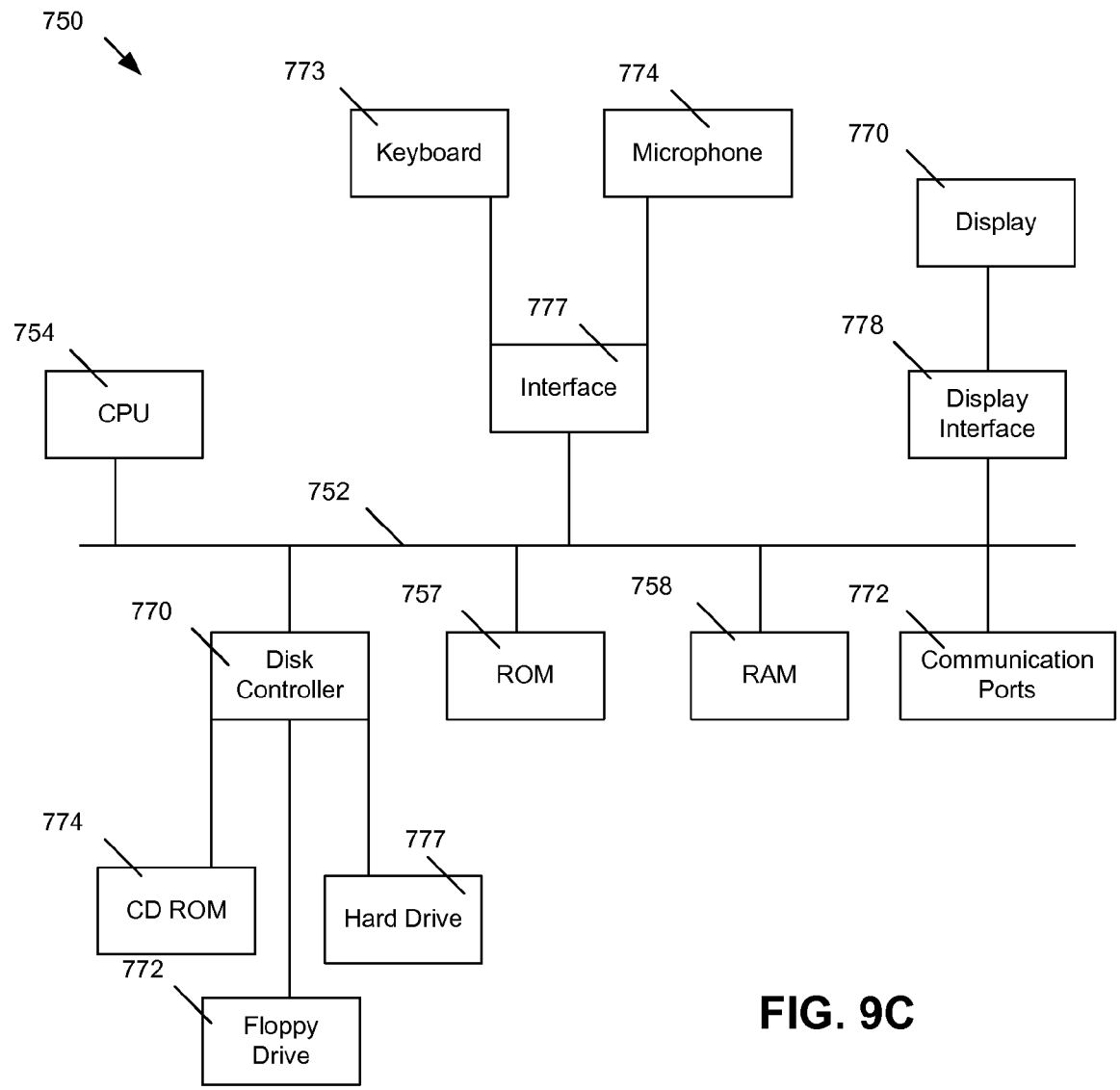

FIGS. 9A, 9B, and 9C depict example systems for classifying a spoken response as being plagiarized or non-plagiarized. For example, FIG. 9A depicts an exemplary system 700 that includes a standalone computer architecture where a processing system 702 (e.g., one or more computer processors located in a given computer or in multiple computers that may be separate and distinct from one another) includes one or more models 704 being executed on the processing system 702. The processing system 702 has access to a computer-readable memory 706 in addition to one or more data stores 708. The one or more data stores 708 may include human-classified responses 710 as well as source text 712. The processing system 702 may be a distributed parallel computing environment, which may be used to handle very large-scale data sets.

FIG. 9B depicts a system 720 that includes a client-server architecture. One or more user PCs 722 access one or more servers 724 running one or more models 726 on a processing system 727 via one or more networks 728. The one or more servers 724 may access a computer-readable memory 730 as well as one or more data stores 732. The one or more data stores 732 may contain human-classified responses 734 as well as source text 737.

FIG. 9C shows a block diagram of exemplary hardware for a standalone computer architecture 750, such as the architecture depicted in FIG. 9A that may be used to contain and/or implement the program instructions of system embodiments of the present disclosure. A bus 752 may serve as the information highway interconnecting the other illustrated components of the hardware. A processing system 754 labeled CPU (central processing unit) (e.g., one or more computer processors at a given computer or at multiple computers), may perform calculations and logic operations required to execute a program. A non-transitory processor-readable storage medium, such as read only memory (ROM) 756 and random access memory (RAM) 758, may be in communication with the processing system 754 and may contain one or more programming instructions for performing the method for classifying a spoken response as being plagiarized or non-plagiarized. Optionally, program instructions may be stored on a non-transitory computer-readable storage medium such as a magnetic disk, optical disk, recordable memory device, flash memory, or other physical storage medium.

In FIGS. 9A, 9B, and 9C, computer readable memories 706, 730, 756, 758 or data stores 708, 732, 762, 764, 766 may include one or more data structures for storing and associating various data used in the example systems for classifying a spoken response as being plagiarized or non-plagiarized. For example, a data structure stored in any of the aforementioned locations may be used to associate numerical measures of features and evidence of such numerical measures within a human-classified response. As another example, a data structure may be used to relate variables of a model with associated weighting factors. Other aspects of the example systems for classifying a spoken response as being plagiarized or non-plagiarized may be stored and associated in the one or more data structures (e.g., numerical measures, classifications for human-classified reference responses, etc.).

A disk controller 760 interfaces one or more optional disk drives to the system bus 752. These disk drives may be external or internal floppy disk drives such as 762, external or internal CD-ROM, CD-R, CD-RW or DVD drives such as 764, or external or internal hard drives 766. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 760, the ROM 756 and/or the RAM 758. The processor 754 may access one or more components as required.

A display interface 768 may permit information from the bus 752 to be displayed on a display 770 in audio, graphic, or alphanumeric format. Communication with external devices may optionally occur using various communication ports 772.

In addition to these computer-type components, the hardware may also include data input devices, such as a keyboard 773, or other input device 774, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method of classifying a spoken response as being plagiarized or non-plagiarized, the method comprising:
    processing a spoken response with a processing system to generate a first text that is representative of the spoken response;
    processing the first text with the processing system to remove disfluencies in the first text;
    processing the first text with the processing system to identify a plurality of n-grams in the first text;
    processing the first text with the processing system to identify a plurality of sentences in the first text;
    processing the plurality of n-grams and a source text with the processing system to determine a first numerical measure indicative of a number of words and phrases of the first text that are included verbatim in the source text, each of the n-grams being compared to n-grams of the source text to determine the first numerical measure, the source text having been designated as a source of plagiarized content;
    processing the first text and the source text with the processing system to determine a second numerical measure indicative of (i) an amount of the first text that paraphrases portions of the source text, or (ii) an amount of the first text that is semantically-similar to portions of the source text, the second numerical measure being determined by comparing units of text of the first text with corresponding units of text of the source text;
    processing the plurality of sentences and the source text with the processing system to determine a third numerical measure indicative of a similarity between sentences of the first text and sentences of the source text, each sentence of the plurality of sentences being compared to each sentence of the source text to determine the third numerical measure; and
    applying a model to the first numerical measure, the second numerical measure, and the third numerical measure to classify the spoken response as being plagiarized or non-plagiarized, the model including
        a first variable and an associated first weighting factor, the first variable receiving a value of the first numerical measure,
        a second variable and an associated second weighting factor, the second variable receiving a value of the second numerical measure, and
        a third variable and an associated third weighting factor, the third variable receiving a value of the third numerical measure.

2. The computer-implemented method of claim 1, wherein the processing of the first text with the processing system to identify the plurality of sentences includes (i) determining locations of one or more sentence boundaries in the first text, and (ii) segmenting the first text into the plurality of sentences based on the one or more sentence boundaries, and wherein the determining of the third numerical measure comprises:
    comparing each sentence of the plurality of sentences to each sentence of the source text in a sentence-to-sentence comparison, each of the comparisons generating a value indicative of a degree of similarity between the compared sentences;
    determining a first metric, the first metric being a maximum value of the generated values;
    determining a second metric, the second metric being an average of the generated values;
    determining a third metric, the determining of the third metric including
        (i) determining, for each sentence of the plurality of sentences, a maximum sentence value, wherein the maximum sentence value is a maximum value of a subset of the values, the subset including values generated based on the comparison of the sentence to the sentences of the source text, and
        (ii) determining an average of the maximum sentence values, the average of the maximum sentence values being the third metric.

3. The computer-implemented method of claim 2, wherein the value indicative of the degree of similarity between the sentence of the first text and the sentence of the source text (i) indicates a number of words and phrases of the sentence of the first text that are included verbatim in the sentence of the source text, or (ii) indicates an amount of the sentence of the first text that paraphrases portions of the sentence of the source text.

4. The computer-implemented method of claim 1, wherein the processing of the spoken response to generate the first text includes applying an automatic speech recognition (ASR) algorithm to the spoken response, the ASR algorithm generating (i) a plurality of word hypotheses, and (ii) a confidence score for each of the word hypotheses, and wherein the first numerical measure is based on a weighted summation of scores, the scores being indicative of whether a word or phrase of the first text is included in the source text, and weights utilized in the weighted summation being based on the confidence scores.

5. The computer-implemented method of claim 1, wherein the disfluencies include filled pauses, filler words, recognized partial words, and repeated words.

6. The computer-implemented method of claim 1, wherein each of the comparisons generates a value indicative of an amount of the sentence of the first text that appears verbatim or in paraphrased form in the sentence of the source text, the third numerical measure being based on the generated values.

7. A system for classifying a spoken response as being plagiarized or non-plagiarized, the system comprising:
   a processing system; and
   computer-readable memory in communication with the processing system encoded with instructions for commanding the processing system to execute steps comprising:
   processing a spoken response to generate a first text that is representative of the spoken response;
   processing the first text to remove disfluencies in the first text;
   processing the first text to identify a plurality of n-grams in the first text;
   processing the first text to identify a plurality of sentences in the first text;
   processing the plurality of n-grams and a source text to determine a first numerical measure indicative of a number of words and phrases of the first text that are included verbatim in the source text, each of the n-grams being compared to n-grams of the source text to determine the first numerical measure, the source text having been designated as a source of plagiarized content;
   processing the first text and the source text to determine a second numerical measure indicative of (i) an amount of the first text that paraphrases portions of the source text, or (ii) an amount of the first text that is semantically-similar to portions of the source text, the second numerical measure being determined by comparing units of text of the first text with corresponding units of text of the source text;
   processing the plurality of sentences and the source text to determine a third numerical measure indicative of a similarity between sentences of the first text and sentences of the source text, each sentence of the plurality of sentences being compared to each sentence of the source text to determine the third numerical measure; and
   applying a model to the first numerical measure, the second numerical measure, and the third numerical measure to classify the spoken response as being plagiarized or non-plagiarized, the model including
      a first variable and an associated first weighting factor, the first variable receiving a value of the first numerical measure,
      a second variable and an associated second weighting factor, the second variable receiving a value of the second numerical measure, and
      a third variable and an associated third weighting factor, the third variable receiving a value of the third numerical measure.

8. The system of claim 7, wherein the processing of the first text to identify the plurality of sentences includes (i) determining locations of one or more sentence boundaries in the first text, and (ii) segmenting the first text into the plurality of sentences based on the one or more sentence boundaries, and wherein the determining of the third numerical measure comprises:
   comparing each sentence of the plurality of sentences to each sentence of the source text in a sentence-to-sentence comparison, each of the comparisons generating a value indicative of a degree of similarity between the compared sentences;
   determining a first metric, the first metric being a maximum value of the generated values;
   determining a second metric, the second metric being an average of the generated values;
   determining a third metric, the determining of the third metric including
      (i) determining, for each sentence of the plurality of sentences, a maximum sentence value, wherein the maximum sentence value is a maximum value of a subset of the values, the subset including values generated based on the comparison of the sentence to the sentences of the source text, and
      (ii) determining an average of the maximum sentence values, the average of the maximum sentence values being the third metric.

9. The system of claim 8, wherein the value indicative of the degree of similarity between the sentence of the first text and the sentence of the source text (i) indicates a number of words and phrases of the sentence of the first text that are included verbatim in the sentence of the source text, or (ii) indicates an amount of the sentence of the first text that paraphrases portions of the sentence of the source text.

10. The system of claim 7, wherein the processing of the spoken response to generate the first text includes applying an automatic speech recognition (ASR) algorithm to the spoken response, the ASR algorithm generating (i) a plurality of word hypotheses, and (ii) a confidence score for each of the word hypotheses, and wherein the first numerical measure is based on a weighted summation of scores, the scores being indicative of whether a word or phrase of the first text is included in the source text, and weights utilized in the weighted summation being based on the confidence scores.

11. The system of claim 7, wherein the disfluencies include filled pauses, filler words, recognized partial words, and repeated words.

12. The system of claim 7, wherein each of the comparisons generates a value indicative of an amount of the sentence of the first text that appears verbatim or in paraphrased form in the sentence of the source text, the third numerical measure being based on the generated values.

13. A non-transitory computer-readable storage medium for classifying a spoken response as being plagiarized or non-plagiarized, the computer-readable storage medium comprising computer executable instructions which, when executed, cause a processing system to execute steps comprising:
   processing a spoken response to generate a first text that is representative of the spoken response;
   processing the first text to remove disfluencies in the first text;
   processing the first text to identify a plurality of n-grams in the first text;
   processing the first text to identify a plurality of sentences in the first text;

processing the plurality of n-grams and a source text to determine a first numerical measure indicative of a number of words and phrases of the first text that are included verbatim in the source text, each of the n-grams being compared to n-grams of the source text to determine the first numerical measure, the source text having been designated as a source of plagiarized content;

processing the first text and the source text to determine a second numerical measure indicative of (i) an amount of the first text that paraphrases portions of the source text, or (ii) an amount of the first text that is semantically-similar to portions of the source text, the second numerical measure being determined by comparing units of text of the first text with corresponding units of text of the source text;

processing the plurality of sentences and the source text to determine a third numerical measure indicative of a similarity between sentences of the first text and sentences of the source text, each sentence of the plurality of sentences being compared to each sentence of the source text to determine the third numerical measure; and applying a model to the first numerical measure, the second numerical measure, and the third numerical measure to classify the spoken response as being plagiarized or non-plagiarized, the model including a first variable and an associated first weighting factor, the first variable receiving a value of the first numerical measure, a second variable and an associated second weighting factor, the second variable receiving a value of the second numerical measure, and a third variable and an associated third weighting factor, the third variable receiving a value of the third numerical measure.

14. The non-transitory computer-readable storage medium of claim 13, wherein the processing of the first text to identify the plurality of sentences includes (i) determining locations of one or more sentence boundaries in the first text, and (ii) segmenting the first text into the plurality of sentences based on the one or more sentence boundaries, and wherein the determining of the third numerical measure comprises:

comparing each sentence of the plurality of sentences to each sentence of the source text in a sentence-to-sentence comparison, each of the comparisons generating a value indicative of a degree of similarity between the compared sentences;

determining a first metric, the first metric being a maximum value of the generated values;

determining a second metric, the second metric being an average of the generated values;

determining a third metric, the determining of the third metric including (i) determining, for each sentence of the plurality of sentences, a maximum sentence value, wherein the maximum sentence value is a maximum value of a subset of the values, the subset including values generated based on the comparison of the sentence to the sentences of the source text, and (ii) determining an average of the maximum sentence values, the average of the maximum sentence values being the third metric.

15. The non-transitory computer-readable storage medium of claim 14, wherein the value indicative of the degree of similarity between the sentence of the first text and the sentence of the source text (i) indicates a number of words and phrases of the sentence of the first text that are included verbatim in the sentence of the source text, or (ii) indicates an amount of the sentence of the first text that paraphrases portions of the sentence of the source text.

16. The non-transitory computer-readable storage medium of claim 13, wherein the processing of the spoken response to generate the first text includes applying an automatic speech recognition (ASR) algorithm to the spoken response, the ASR algorithm generating (i) a plurality of word hypotheses, and (ii) a confidence score for each of the word hypotheses, and wherein the first numerical measure is based on a weighted summation of scores, the scores being indicative of whether a word or phrase of the first text is included in the source text, and weights utilized in the weighted summation being based on the confidence scores.

17. The non-transitory computer-readable storage medium of claim 13, wherein the disfluencies include filled pauses, filler words, recognized partial words, and repeated words.

18. The non-transitory computer-readable storage medium of claim 13, wherein each of the comparisons generates a value indicative of an amount of the sentence of the first text that appears verbatim or in paraphrased form in the sentence of the source text, the third numerical measure being based on the generated values.

19. A computer-implemented method of constructing a model to classify a spoken response as being plagiarized or non-plagiarized, the method comprising:

specifying a model, the model comprising a first variable and an associated first weighting factor, the first variable indicative of a number of words and phrases of a first text that are included verbatim in a source text, as determined based on a comparison of n-grams of the first text to n-grams of the source text, the source text having been designated as a source of plagiarized content, a second variable and an associated second weighting factor, the second variable indicative of (i) an amount of the first text that paraphrases portions of the source text, or (ii) an amount of the first text that is semantically-similar to portions of the source text, as determined based on comparing units of text of the first text with corresponding units of text of the source text, and a third variable and an associated third weighting factor, the third variable indicative of a similarity between sentences of the first text and sentences of the source text, as determined based on a comparison of each sentence of the first text with each sentence of the source text;

receiving a plurality of reference responses, each reference response having been assigned a classification that classifies the reference response as being plagiarized or non-plagiarized, the reference responses having been accepted as usable for training the model;

training the model with a processing system using the reference responses and the classifications of the reference responses to determine values for each of the first, second, and third weighting factors; and configuring the model with the determined values of the first, second, and third weighting factors to receive a first numerical measure, a second numerical measure, and a third numerical measure for the first variable, second variable, and third variable, respectively, of an actual spoken response to be classified so as to generate a classification for the actual spoken response that classifies the actual spoken response as being plagiarized or non-plagiarized.

20. The computer-implemented method of claim 19, wherein the training comprises:
processing each of the reference responses to determine for each reference response
a first numerical measure indicative of a number of words and phrases of the reference response that are included verbatim in the source text,
a second numerical measure indicative of (i) an amount of the reference response that paraphrases portions of the source text, or (ii) an amount of the reference response that is semantically-similar to portions of the source text, and
a third numerical measure indicative of a similarity between sentences of the reference response and sentences of the source text; and
conducting a numerical machine-learning analysis based on the first, second, and third numerical measures and classification for each of the plurality of reference responses to determine the first, second, and third weighting factors.

21. The computer-implemented method of claim 20, wherein the determining of the third numerical measure for each reference response comprises:
comparing each sentence of the reference response to each sentence of the source text in a sentence-to-sentence comparison, each of the comparisons generating a value indicative of a degree of similarity between the compared sentences;
determining a first metric, the first metric being a maximum value of the generated values;
determining a second metric, the second metric being an average of the generated values;
determining a third metric, the determining of the third metric including
(i) determining, for each sentence of the reference response, a maximum sentence value, wherein the maximum sentence value is a maximum value of a subset of the values, the subset including values generated based on the comparison of the sentence to the sentences of the source text, and
(ii) determining an average of the maximum sentence values, the average of the maximum sentence values being the third metric.

22. A system for constructing a model to classify a spoken response as being plagiarized or non-plagiarized, the system comprising:
a processing system; and
computer-readable memory in communication with the processing system encoded with instructions for commanding the processing system to execute steps comprising:
specifying a model, the model comprising
a first variable and an associated first weighting factor, the first variable indicative of a number of words and phrases of a first text that are included verbatim in a source text, as determined based on a comparison of n-grams of the first text to n-grams of the source text, the source text having been designated as a source of plagiarized content,
a second variable and an associated second weighting factor, the second variable indicative of (i) an amount of the first text that paraphrases portions of the source text, or (ii) an amount of the first text that is semantically-similar to portions of the source text, as determined based on comparing units of text of the first text with corresponding units of text of the source text, and
a third variable and an associated third weighting factor, the third variable indicative of a similarity between sentences of the first text and sentences of the source text, as determined based on a comparison of each sentence of the first text with each sentence of the source text;
receiving a plurality of reference responses, each reference response having been assigned a classification that classifies the reference response as being plagiarized or non-plagiarized, the reference responses having been accepted as usable for training the model;
training the model using the reference responses and the classifications of the reference responses to determine values for each of the first, second, and third weighting factors; and
configuring the model with the determined values of the first, second, and third weighting factors to receive a first numerical measure, a second numerical measure, and a third numerical measure for the first variable, second variable, and third variable, respectively, of an actual spoken response to be classified so as to generate a classification for the actual spoken response that classifies the actual spoken response as being plagiarized or non-plagiarized.

23. The system of claim 22, wherein the training comprises:
processing each of the reference responses to determine for each reference response
a first numerical measure indicative of a number of words and phrases of the reference response that are included verbatim in the source text,
a second numerical measure indicative of (i) an amount of the reference response that paraphrases portions of the source text, or (ii) an amount of the reference response that is semantically-similar to portions of the source text, and
a third numerical measure indicative of a similarity between sentences of the reference response and sentences of the source text; and
conducting a numerical machine-learning analysis based on the first, second, and third numerical measures and classification for each of the plurality of reference responses to determine the first, second, and third weighting factors.

24. The system of claim 23, wherein the determining of the third numerical measure for each reference response comprises:
comparing each sentence of the reference response to each sentence of the source text in a sentence-to-sentence comparison, each of the comparisons generating a value indicative of a degree of similarity between the compared sentences;
determining a first metric, the first metric being a maximum value of the generated values;
determining a second metric, the second metric being an average of the generated values;
determining a third metric, the determining of the third metric including
(i) determining, for each sentence of the reference response, a maximum sentence value, wherein the maximum sentence value is a maximum value of a subset of the values, the subset including values generated based on the comparison of the sentence to the sentences of the source text, and (ii) determining an average of the maximum sentence values, the average of the maximum sentence values being the third metric.

25. A non-transitory computer-readable storage medium for constructing a model to classify a spoken response as being plagiarized or non-plagiarized, the computer-readable storage medium comprising computer executable instructions which, when executed, cause a processing system to execute steps comprising:
specifying a model, the model comprising
a first variable and an associated first weighting factor, the first variable indicative of a number of words and phrases of a first text that are included verbatim in a source text, as determined based on a comparison of n-grams of the first text to n-grams of the source text, the source text having been designated as a source of plagiarized content,
a second variable and an associated second weighting factor, the second variable indicative of (i) an amount of the first text that paraphrases portions of the source text, or (ii) an amount of the first text that is semantically-similar to portions of the source text, as determined based on comparing units of text of the first text with corresponding units of text of the source text, and
a third variable and an associated third weighting factor, the third variable indicative of a similarity between sentences of the first text and sentences of the source text, as determined based on a comparison of each sentence of the first text with each sentence of the source text;
receiving a plurality of reference responses, each reference response having been assigned a classification that classifies the reference response as being plagiarized or non-plagiarized, the reference responses having been accepted as usable for training the model;
training the model using the reference responses and the classifications of the reference responses to determine values for each of the first, second, and third weighting factors; and
configuring the model with the determined values of the first, second, and third weighting factors to receive a first numerical measure, a second numerical measure, and a third numerical measure for the first variable, second variable, and third variable, respectively, of an actual spoken response to be classified so as to generate a classification for the actual spoken response that classifies the actual spoken response as being plagiarized or non-plagiarized.

26. The non-transitory computer-readable storage medium of claim 25, wherein the training comprises:
processing each of the reference responses to determine for each reference response
a first numerical measure indicative of a number of words and phrases of the reference response that are included verbatim in the source text,
a second numerical measure indicative of (i) an amount of the reference response that paraphrases portions of the source text, or (ii) an amount of the reference response that is semantically-similar to portions of the source text, and
a third numerical measure indicative of a similarity between sentences of the reference response and sentences of the source text; and
conducting a numerical machine-learning analysis based on the first, second, and third numerical measures and classification for each of the plurality of reference responses to determine the first, second, and third weighting factors.

27. The non-transitory computer-readable storage medium of claim 26, wherein the determining of the third numerical measure for each reference response comprises:
comparing each sentence of the reference response to each sentence of the source text in a sentence-to-sentence comparison, each of the comparisons generating a value indicative of a degree of similarity between the compared sentences;
determining a first metric, the first metric being a maximum value of the generated values;
determining a second metric, the second metric being an average of the generated values;
determining a third metric, the determining of the third metric including
(i) determining, for each sentence of the reference response, a maximum sentence value, wherein the maximum sentence value is a maximum value of a subset of the values, the subset including values generated based on the comparison of the sentence to the sentences of the source text, and
(ii) determining an average of the maximum sentence values, the average of the maximum sentence values being the third metric.

* * * * *